US011713374B2

(12) United States Patent
Zweig et al.

(10) Patent No.: US 11,713,374 B2
(45) Date of Patent: Aug. 1, 2023

(54) SCHIFF BASE OLIGOMERS

(71) Applicant: THE BOEING COMPANY, Chicago, IL (US)

(72) Inventors: Andrew Michael Zweig, Chesterfield, MO (US); Waynie M. Schuette, Troy, IL (US)

(73) Assignee: THE BOEING COMPANY, Arlington, VA (US)

(*) Notice: Subject to any disclaimer, the term of this patent is extended or adjusted under 35 U.S.C. 154(b) by 317 days.

(21) Appl. No.: 17/191,024

(22) Filed: Mar. 3, 2021

(65) Prior Publication Data

US 2021/0284801 A1    Sep. 16, 2021

Related U.S. Application Data

(60) Provisional application No. 62/985,579, filed on Mar. 5, 2020.

(51) Int. Cl.
| | |
|---|---|
| *C08G 75/00* | (2006.01) |
| *C08G 12/40* | (2006.01) |
| *C08G 59/22* | (2006.01) |
| *C08G 59/50* | (2006.01) |
| *C09D 5/08* | (2006.01) |
| *C23F 11/16* | (2006.01) |
| *C23F 11/173* | (2006.01) |

(52) U.S. Cl.
CPC .................................. *C08G 75/00* (2013.01)

(58) Field of Classification Search
None
See application file for complete search history.

(56) References Cited

FOREIGN PATENT DOCUMENTS

| CN | 108144591 A | * | 6/2018 | ............ | B01J 20/268 |
|---|---|---|---|---|---|
| CN | 108144591 A | | 6/2018 | | |
| GB | 1360844 A | | 7/1974 | | |

OTHER PUBLICATIONS

Ghaemy et al., "Structure and Metal Type Effects on Cure Kinetics of DGEBA with Benzil Bisthiosemicarbazone Complexes," Journal of Applied Polymer Sciences, vol. 107, pp. 4021-4028 (2008) (Year: 2008).*
Ghaemy et al., "Study of cure kinetics of DGEBA with optically active curing agents" Journal of Therm. Anal. Calorim, vol. 101, pp. 1011-1017 (2010) (Year: 2010).*
Ghaemy et al., "Study of Cure Kinetics of Diglycidyl Ether of Bisphenol A with Ni(II) and Cu(II) Complexes of Benzil Bisthiosemicarbazone," Journal of Applied Polymer Sciences, vol. 106, pp. 4060-4066 (2007) (Year: 2007).*
Gupta et al. "Green Schiff's bases as corrosion inhibitors for mild steel in 1 M HCI solution: experimental and theoretical approach," RSC Adv., 2016, 6, 102076-102087.
Raza Rasool, Sumaiya hasnain and Nahid Nishat, "Coordination Polymers: Preparation, Physicochemical Characterization, Thermal and Biological Evaluation of Thiosemicarbazide Polychelates," Accepted: Dec. 19, 2014 / Published online: Dec. 30, 2014, 763 pages.
Ahmad Mudasir et al., "Synthesis of terepthalaldehyde and thiosemicarbazide plymeric metal complexes containing Cu (II) and Zn (II): Evaluation of photophysical and antibacterial properties", Optik, Wissenschaftliche Verlag GMBH, DE, vol. 127, No. 4, Nov. 19, 2015 (Nov. 19, 2015), pp. 1738-1742.
Karthik Namachivayam et al: "Improved copper corrosion resistance of epoxy-functionalized hybrid sol-gel monolayers by thiosemicarbazide", Ionics, Kiel, DE, vol. 21, No. 5, Oct. 10, 2014 (Oct. 10, 2014), pp. 1477-1488.
PCT Notification of Transmittal of The International Search Report and The Written Opinion of The International Searching Authority, or The Declaration for Application PCT/US2021/020986, dated Aug. 6, 2021.
Hasnain Sumaiya et al: "Metal-containing polyurethanes from tetradentate Schiff bases: synthesis, characterization, and biocidal activities", Journal of Coordination Chemistry, vol. 64, No. 6, Mar. 20, 2011 (Mar. 20, 2011), pp. 952-964.
PCT Notification of Transmittal of The International Search Report and The Written Opinion of The International Searching Authority, or The Declaration for Application PCT/US2021/020985 dated Jul. 30, 2021.

* cited by examiner

*Primary Examiner* — Randy P Gulakowski
*Assistant Examiner* — Ha S Nguyen
(74) *Attorney, Agent, or Firm* — Patterson + Sheridan, LLP

(57) ABSTRACT

Aspects of the present disclosure relate to Schiff base oligomers and uses thereof. In at least one aspect, an oligomer is represented by Formula (I) wherein each instance of $R^4$, $R^5$, $R^6$, $R^7$, $R^8$, $R^{10}$, $R^{11}$, $R^{12}$, $R^{13}$, and $R^{14}$ is independently selected from the group consisting of hydrogen, alkyl, cycloalkyl, alkoxyl, aryloxyl, ether, and heterocyclyl. Each instance of $R^9$ of Formula (I) is independently selected from the group consisting of alkyl, cycloalkyl, aryl, heterocyclyl, and ether. Each instance of $R^{28}$ and $R^{29}$ of Formula (I) is independently selected from the group consisting of hydrogen, alkyl, and aryl. Each instance of $R^{33}$ of Formula (I) is independently selected from the group consisting of alkyl, cycloalkyl, aryl, heterocyclyl, and a bond. Each instance of $R^{41}$ of Formula (I) is independently —NH— or a bond and each instance of $R^{40}$ is independently —NH— or —NH—NH—.

20 Claims, No Drawings

SCHIFF BASE OLIGOMERS

CROSS-REFERENCE TO RELATED APPLICATIONS

This application claims priority to U.S. Provisional Patent Application No. 62/985,579, filed Mar. 5, 2020. The above referenced application is incorporated herein by reference in its entirety.

FIELD

Aspects of the present disclosure relate to Schiff base oligomers and uses thereof.

BACKGROUND

Metals, such as steel, aluminum, aluminum alloys, and galvanized metals, used in the manufacture of aircraft, spacecraft, and other machinery can be susceptible to corrosion. Chromates, such as zinc salts of hexavalent chromium, have been used as corrosion inhibitors in corrosion inhibiting coatings such as in paints, sealants and wash primers. There is a desire to reduce the amount of chromate used in coatings and other applications.

Overall, hex-chrome alternative corrosion inhibitors can have limitations compared against those containing hexavalent chromium and their adhesion may be inadequate to underlying substrates and coatings disposed thereon, particularly to meet aerospace performance requirements.

There is a need for new corrosion inhibitors to provide improved coatings to protect metal surfaces against corrosion while using little or no hexavalent chromium.

SUMMARY

Aspects of the present disclosure relate to Schiff base oligomers and uses thereof.

In at least one aspect, an oligomer is represented by Formula (I):

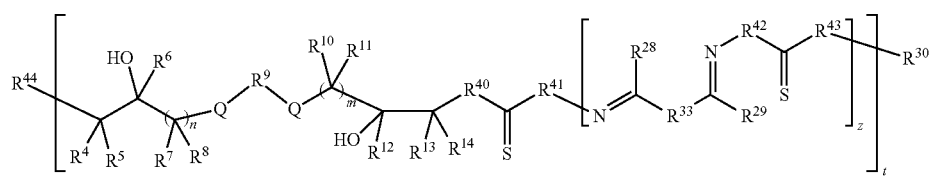

wherein:
each instance of $R^4$, $R^5$, $R^6$, $R^7$, $R^8$, $R^{10}$, $R^{11}$, $R^{12}$, $R^{13}$, and $R^{14}$ is independently selected from the group consisting of hydrogen, alkyl, cycloalkyl, alkoxyl, aryloxyl, ether, and heterocyclyl; each instance of $R^9$ is independently selected from the group consisting of alkyl, cycloalkyl, aryl, heterocyclyl, and ether;

each instance of $R^{28}$ and $R^{29}$ is independently selected from the group consisting of hydrogen, alkyl, and aryl;

each instance of $R^{33}$ is independently selected from the group consisting of alkyl, cycloalkyl, aryl, heterocyclyl, and a bond;

each instance of $R^{41}$ is independently —NH— or a bond and each instance of $R^{40}$ is independently —NH— or —NH—NH—;

each instance of $R^{42}$ is independently —NH— or a bond and each instance of $R^{43}$ is independently —NH— or —NH—NH—;

each instance of Q is independently —$CH_2$— or oxygen;

each instance of n, m, z and t is an integer of 1 to 50;

$R^{44}$ is hydroxyl, hydroxy-substituted alkyl, or is represented by the structure:

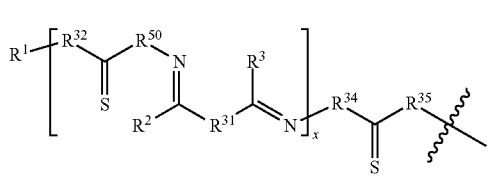

where:
$R^1$ is hydrogen or silyl;

$R^2$ and $R^3$ are independently selected from the group consisting of hydrogen, alkyl, and aryl;

$R^{31}$ is selected from the group consisting of alkyl, cycloalkyl, aryl, heterocyclyl, and a bond;

$R^{50}$ is —NH— or a bond and $R^{32}$ is —NH— or —NH—NH—;

$R^{34}$ is —NH— or a bond and $R^{35}$ is —NH— or —NH—NH—; and x is an integer of 1 to 50; and $R^{30}$ is hydrogen, silyl, or is represented by the structure:

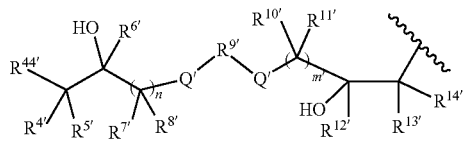

where:
each of $R^{4'}$, $R^{5'}$, $R^{6'}$, $R^{7'}$, $R^{8'}$, $R^{10'}$, $R^{11'}$ $R^{12'}$, $R^{13'}$, and $R^{14'}$ is independently selected from the group consisting of hydrogen, alkyl, cycloalkyl, alkoxyl, aryloxyl, ether, and heterocyclyl;

$R^{9'}$ selected from the group consisting of alkyl, cycloalkyl, heterocyclyl, and ether;

$R^{44'}$ is hydroxyl or hydroxy-substituted alkyl;

each instance of Q' is independently —$CH_2$— or oxygen; and each of n' and m' is an integer of 1 to 50.

DETAILED DESCRIPTION

Aspects of the present disclosure relate to Schiff base oligomers and uses thereof. Schiff base oligomers may have one or more silyl groups to provide for binding to metals to prevent corrosion and enhance adhesion to metals and metal oxides. In general, a Schiff base is a compound with the general structure $R_1R_2C=NR'$ where $R'\neq H$.

In some aspects, a Schiff base oligomer includes two or more repeating units of a Schiff base monomeric unit, each Schiff base monomeric unit having at least one thiocarbonyl group. A Schiff base oligomer can have a linking unit linking the two or more repeating units of a Schiff base monomeric unit. For example, the linking unit can have a hydroxyl group. Alternatively, the linking unit can be a urea-containing unit.

A Schiff base oligomer may be dispersible in a solvent. A Schiff base oligomer may be in a composition with (e.g., dispersed with or ionically bonded to) one or more metals. For example, a metal can be a cationic species of a transition metal.

In some aspects, a Schiff base oligomer serves as a film-forming coating in which the Schiff base monomeric unit(s) inhibit metal corrosion. The Schiff base oligomer provides improved adhesion of the Schiff base oligomer to the surface of a metal and increased concentration of the inhibitor at the surface, as compared to conventional corrosion inhibitors. A Schiff base oligomer can provide a slow-release or controlled release system that can offer long-term corrosion inhibition by slow dissolution or slow hydrolysis of the polymer or oligomer in comparison to a small molecule Schiff base, such as a small molecule Schiff base of less than 300 Daltons.

In certain aspects, a Schiff base oligomer has a molecular weight of 300 Daltons or more, such as 500 Daltons or more, such as 1,000 Daltons or more, such as 10,000 Daltons or more, such as 15,000 Daltons or more.

A Schiff base oligomer can interact with a metal (e.g., of a composition and/or a metal substrate) through the tertiary nitrogen atoms and the thiocarbonyl sulfur atom. By having a large number of groups on the same molecule capable of interacting (e.g., chelating) with a metal, once an initial group interacts with, e.g., the metal surface, each subsequent group can interact with a lower loss of enthalpy, lowering the barrier to formation and increasing the stability, ultimately improving the adhesion of the Schiff base oligomer as compared to conventional corrosion inhibitors. In addition, in examples where a Schiff base oligomer has a silyl end cap, the silyl group can provide further adhesion of the Schiff base oligomer to a substrate via one or more atoms of the silyl group.

In certain aspects, a Schiff base oligomer has good adhesion to metal (e.g., pure metal, metal alloy, and/or metal oxide) surfaces, and provides corrosion inhibition by coordination to the surface through the imine, thiocarbonyl, secondary hydroxyl groups, and/or urea-containing units. Additionally, the secondary hydroxyl groups can react with epoxy and urethane primers to provide a tie-layer feature. For example, the hydroxyl groups of a Schiff base oligomer can react with isocyanate groups of urethane primers. The oligomers provide multiple functional binding sites, which help provide durability and have a low enough glass transition temperature (Tg) (e.g., about $-25°$ C. or lower) to avoid crystallization.

Adhesion can be determined as described in Rasool et al, J. Inorg. Organomet Polym. 2015, Vol. 15, pp 763-771 which provides detailed IR (Table 2), 1H NMR (section 5.3, and Electronic Spectra (Section 5.4 and Table 3) of free Schiff base complexes and related metal complexes. The data confirm the formation of metal bonds to nitrogen and oxygen atoms in the complexes. IR stretching frequencies shift by 8 to 25 cm$^{-1}$ upon formation of the metal-nitrogen or metal-oxygen bond. The Schiff bases are polymeric species that form complexes to discrete metal atoms.

In certain aspects, a Schiff base oligomer includes polymeric thiosemicarbazone monomeric units having imine and thiocarbonyl groups and one or more optional secondary hydroxyl groups and/or one or more urea-containing units for providing adhesion to a metal substrate.

A Schiff base oligomer can be reacted with an ether, such as polyethylene glycol diglycidyl ether, diglycidyl ethers, or other suitable ethers, to increase the dispersibility of the Schiff base oligomer. The dispersible Schiff base polymers (e.g., water-soluble, water-dispersible, aqueous-organic solvent blend-soluble, aqueous-organic solvent blend-dispersible, organic solvent-soluble, organic solvent-dispersible) have good adhesion to metal and metal oxide surfaces, and to provide corrosion inhibition by coordination to the surface through the imine, thiocarbonyl/carbonyl, and/or hydroxyl groups. Additionally, the hydroxyl groups, such as secondary hydroxyl groups, can react with epoxy and urethane primers to provide a tie-layer feature. For example, available secondary hydroxyl groups could react with isocyanates of polyurethane coating formulations. Formation of a covalent bond may be desirable to bond to primers. The polymers provide multiple functional binding sites, which will help provide the required durability and have a low enough Tg (e.g., about $-25°$ C. or lower) to avoid crystallization, e.g., during use in cold environments. A Schiff base of the present disclosure can provide a corrosion prevention coating suitable for metals that see the range of temperature encountered on commercial and defense aircraft where the outside air temperature at 40,000 feet can be $-40°$ F. or lower.

Methods of Making Schiff Base Oligomers

Methods of making a Schiff base oligomer include reacting a Schiff base monomer having at least one thiocarbonyl group and at least two terminal —NH$_2$ groups with a di-carbonyl to form a first reaction product. For example, a Schiff base monomer can be a thiocarbazide or a thiosemicarbazide. The first reaction product has two terminal —NH$_2$ groups. In some aspects, the Schiff base monomer can be heated, followed by addition of the di-carbonyl, and an acid (such as a strong acid, such as HCl) to form a reaction mixture. The reaction mixture can be allowed to cool (and optionally cooled below ambient temperature) to form the first reaction product.

The first reaction product can be reacted with one or more epoxy-containing compounds to form a second reaction product having one or more hydroxyl groups. Alternatively, the first reaction product can be reacted with one or more isocyanate containing compounds to form a second reaction product having one or more urea-containing linkages and one or more monomeric units having a thiocarbonyl group. Reaction of the first reaction product and epoxy-containing compound (or isocyanate containing compound) can be performed in the presence of a base (such as NaOH) and/or an acid (such as barbituric acid).

The Schiff base oligomer can include two or more Schiff base monomeric units. The Schiff base monomers used can be thiosemicarbazides, thiocarbazides, or any suitable thiocarbonyl-containing compound having two or more terminal (—NH$_2$) groups. For example, a Schiff base oligomer can be made by reacting thiocarbazide or thiosemicarbazide and a di-carbonyl comprising two or more carbonyl groups. A carbonyl comprising two or more carbonyl groups are referred to herein as a "di-carbonyl." The carbonyl groups can be aldehydes, ketones, and combinations thereof. The carbonyl group of a di-carbonyl can react with the nitrogen atom of either ends of a thiocarbazide or thiosemicarbazide. Di-carbonyls can link together two or more thiocarbazides or thiosemicarbazides to form the first reaction product.

Alternatively, a Schiff base oligomer can be made by reacting thiocarbazide or thiosemicarbazide and a diisocyanate comprising two or more isocyanate groups. A carbonyl comprising two or more isocyanate groups are referred to herein as a "diisocyanate." The carbonyl group of a di-isocyanate can react with the nitrogen atom of either ends of a thiocarbazide or thiosemicarbazide. Diisocyanates can link together two or more thiocarbazides or thiosemicarbazides to form the first reaction product.

The terminal amine groups of the first reaction product can react with a di-epoxide to form a Schiff base oligomer. A di-epoxide can provide increased dispersibility. For example, di-epoxides with hydrophilic groups can increase the dispersibility of Schiff base oligomer in aqueous solvents or aqueous-organic blend solvents. For example, epoxies with hydrophobic groups (e.g., organic groups such as alkyl, aryl, etc.) can increase the dispersibility of Schiff base oligomers in organic solvents. Examples of epoxies that can increase water dispersibility include phenol glycidyl ether; lauryl alcohol glycidyl ether, glycerol polyglycidyl ether, trimethylolpropane polyglycidyl ether, pentaerythritol polyglycidyl ether, diglycerol polyglycidyl ether, polyglycerol polyglycidyl ether, sorbitol polyglycidyl ether, ethylene glycol diglycidyl ether, diethylene glycol diglycidyl ether, diethylene glycol diglycidyl ether, polyethylene glycol diglycidyl ether. In certain aspects, the epoxy is a low molecular weight epoxy (e.g., about 600 Daltons or less), such as a low molecular weight polyethylene glycol diglycidyl ether.

Alternatively, the terminal amine groups of the first reaction product can react with a diisocyanate to form a Schiff base oligomer. A diisocyanate can provide increased dispersibility. For example, diisocyanates with hydrophilic groups can increase the dispersibility of Schiff base oligomer in aqueous solvents or aqueous-organic blend solvents. For example, diisocyanate with hydrophobic groups (e.g., organic groups such as alkyl, aryl, etc.) can increase the dispersibility of Schiff base oligomers in organic solvents. Examples of diisocyanate that can increase water dispersibility include methylene-bis(phenyl isocyanate) (MDI), toluene diisocyanate (TDI), hexamethylene diisocyanate (HDI), naphthalene diisocyanate (NDI), methylene bis-cyclohexylisocyanate (HMDI)(hydrogenated MDI), and isophorone diisocyanate (IPDI).

In some aspects, a Schiff base oligomer is a silyl-end capped Schiff base oligomer. A Schiff base oligomer may have one or more terminal amine groups. The one or more terminal amine groups can be reacted with a silyl-containing end cap compound to provide a silyl-end capped Schiff base oligomer. For example, a silyl-containing end cap can have a reactive moiety (e.g., an epoxy group or a leaving group such as a halogen). In some examples, a silyl-containing end cap is an epoxy-containing silyl-containing end cap. The silyl-end capped Schiff base oligomer can provide additional adhesion capability to a substrate.

Methods of Disposing Schiff Base Oligomers Onto Substrates

In some aspects, a method comprises applying a Schiff base oligomer (e.g., dispersed in a solvent) to a substrate, such as a metal substrate. A Schiff base oligomer can be applied over a metal by spraying, brushing, roller coating, or dipping, e.g., for complete coating of a surface. A material that can be applied by a range of methods allows for uses of this technology to be scaled up. The aircraft industry might use spray, whereas an automotive company might use a dip tank for auto frames and rail car manufacturers might use roller or brush methods. The Schiff base oligomer can be dispersible in an aqueous solvent, an organic solvent, or an aqueous-organic solvent blend. Functional groups of the Schiff base oligomer can be reacted with other components, e.g., to increase its dispersibility. In comparison, small molecular Schiff bases are often solid and often can only be applied as a particulate.

In certain aspects, a Schiff base oligomer provides corrosion protection over a long period of time as determined by pass/fail of a 3000 hour ASTM B117 salt fog exposure test. The Schiff base oligomer can form a continuous film that provides corrosion inhibition for metal surfaces for a prolonged period of time. The Schiff base oligomer can form a coating to inhibit corrosion of metal surfaces of aerospace vehicles, cars, trucks, trains, boats, ships, buildings, bridges, and other metal components.

Schiff Base Oligomers

In some aspects, a Schiff base oligomer is represented by Formula (I):

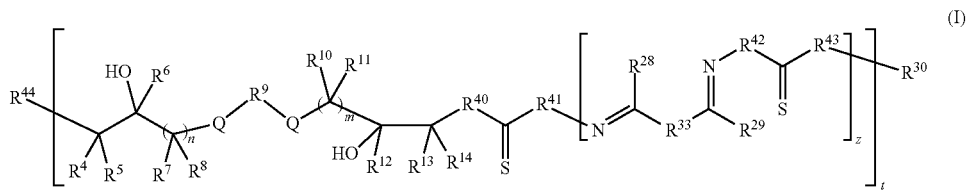

where:
each instance of $R^4$, $R^5$, $R^6$, $R^7$, $R^8$, $R^{10}$, $R^{11}$, $R^{12}$, $R^{13}$, and $R^{14}$ is independently selected from the group consisting of hydrogen, alkyl, cycloalkyl, alkoxyl, aryloxyl, ether, and heterocyclyl; each instance of $R^9$ is independently selected from the group consisting of alkyl, cycloalkyl, aryl, heterocyclyl, and ether;
each instance of $R^{28}$ and $R^{29}$ is independently selected from the group consisting of hydrogen, alkyl, and aryl;
each instance of $R^{33}$ is independently selected from the group consisting of alkyl, cycloalkyl, aryl, heterocyclyl, and a bond;
each instance of $R^{41}$ is independently —NH— or a bond and each instance of $R^{40}$ is independently —NH— or —NH—NH—;
each instance of $R^{42}$ is independently —NH— or a bond and each instance of $R^{43}$ is independently —NH— or —NH—NH—;
each instance of Q is independently —CH$_2$— or oxygen;
each instance of n, m, z and t is an integer of 1 to 50, such as an integer independently selected from the group consisting of 1, 2, 3, 4, 5, 6, 7, 8, 9, and 10;
$R^{44}$ is hydroxyl, hydroxy-substituted alkyl, or is represented by the structure:

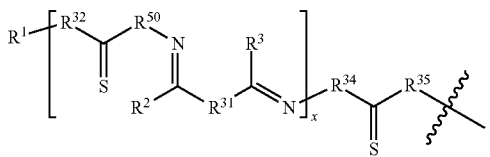

where:
R$^1$ is hydrogen or silyl;
R$^2$ and R$^3$ are independently selected from the group consisting of hydrogen, alkyl, and aryl;
R$^{31}$ is selected from the group consisting of alkyl, cycloalkyl, aryl, heterocyclyl, and a bond;
R$^{50}$ is —NH— or a bond and R$^{32}$ is —NH— or —NH—NH—;
R$^{34}$ is —NH— or a bond and R$^{35}$ is —NH— or —NH—NH—; and
x is an integer of 1 to 50, such as an integer selected from the group consisting of 1, 2, 3, 4, 5, 6, 7, 8, 9, and 10; and
R$^{30}$ is hydrogen, silyl, or is represented by the structure:

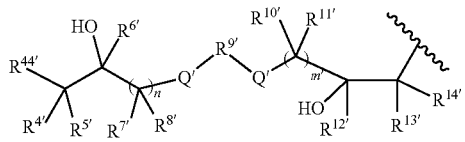

where:
each of R$^{4'}$, R$^{5'}$, R$^{6'}$, R$^{7'}$, R$^{8'}$, R$^{10'}$, R$^{11'}$ R$^{12'}$, R$^{13'}$, and R$^{14'}$ is independently selected from the group consisting of hydrogen, alkyl, cycloalkyl, alkoxyl, aryloxyl, ether, and heterocyclyl;
R$^{9'}$ selected from the group consisting of alkyl, cycloalkyl, heterocyclyl, and ether;
R$^{44'}$ is hydroxyl or hydroxy-substituted alkyl;
each instance of Q' is independently —CH$_2$— or oxygen; and
each of n' and m' is an integer of 1 to 50, such as an integer independently selected from the group consisting of 1, 2, 3, 4, 5, 6, 7, 8, 9, and 10.

In some aspects, each instance of R$^4$, R$^5$, R$^6$, R$^7$, R$^8$, R$^{10}$, R$^{11}$, R$^{12}$, R$^{13}$, and R$^{14}$ (or R$^{4'}$, R$^{5'}$, R$^{6'}$, R$^{7'}$, R$^{8'}$, R$^{10'}$, R$^{11'}$, R$^{12'}$, R$^{13'}$, and R$^{14'}$) is independently selected from the group consisting of hydrogen and C$_1$-C$_5$ alkyl. In some aspects, each instance of R$^4$, R$^5$, R$^6$, R$^7$, R$^8$, R$^{10}$, R$^{11}$, R$^{12}$, R$^{13}$, and R$^{14}$ (or R$^{4'}$, R$^{5'}$, R$^{6'}$, R$^{7'}$, R$^{8'}$, R$^{10'}$, R$^{11'}$, R$^{12'}$, R$^{13'}$, and R$^{14'}$) is hydrogen. In some aspects, each instance of R$^{28}$ or R$^{29}$ (or R$^2$ and R$^3$) is independently selected from the group consisting of hydrogen and C$_1$-C$_5$ alkyl. In some aspects, each instance of R$^{28}$ or R$^{29}$ (or R$^2$ and R$^3$) is hydrogen. In some aspects, each instance of Q is oxygen.

In some aspects, if R$^{41}$ is —NH—, then R$^{40}$ is —NH—, and/or if R$^{41}$ is a bond, then R$^{40}$ is —NH—NH—. In some aspects, if R$^{42}$ is —NH—, then R$^{43}$ is —NH—, and/or if R$^{42}$ is a bond, then R$^{43}$ is —NH—NH—.

In some aspects, if R$^{50}$ is —NH—, then R$^{32}$ is —NH—, wherein if R$^{50}$ is a bond, then R$^{32}$ is —NH—NH—. In some aspects, if R$^{34}$ is —NH—, then R$^{35}$ is —NH—, wherein if R$^{34}$ is a bond, then R$^{35}$ is —NH—NH—.

In some aspects, each instance of R$^9$ (or R$^{9'}$) is independently C$_1$-C$_{10}$ alkyl or a polyether. For example, R$^9$ (or R$^{9'}$) may be a polyether selected from polyethylene glycol and polypropylene glycol. The polyethylene glycol or polypropylene glycol can have a molecular weight of about 100 g/mol to about 1,000 g/mol, such as about 400 g/mol to about 700 g/mol.

In some aspects, each instance of R$^{33}$ (or R$^{31}$) is a bond. In some aspects, each instance of R$^{33}$ (or R$^{31}$) is independently selected from C$_1$-C$_{10}$ alkyl. In some aspects, each instance of R$^{33}$ (or R$^{31}$) is independently selected from a phenyl. For example, a phenyl may be represented by the formula:

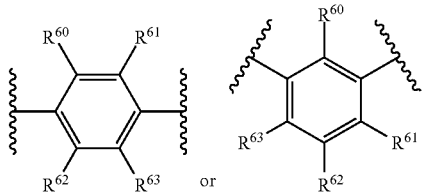

where R$^{60}$, R$^{61}$, R$^{62}$, and R$^{63}$ are independently selected from hydrogen and C$_1$-C$_{10}$ alkyl. In some examples, each of R$^{60}$, R$^{61}$, R$^{62}$, and R$^{63}$ is hydrogen.

In some aspects, R$^{30}$ and R$^1$ are hydrogen. In some aspects, one or both of R$^{30}$ and R$^1$ are silyl. For example, a silyl may be a glycidyl ether silyl. In some aspects, a silyl is represented by the formula:

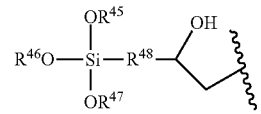

where R$^{45}$, R$^{46}$, and R$^{47}$ are independently selected from the group consisting of hydrogen and C$_1$-C$_{20}$ alkyl, such as C$_1$-C$_5$ alkyl; and R$^{48}$ is selected from the group consisting of (divalent) alkyl, cycloalkyl, ether, and aryl. In some aspects, R$^{48}$ is alkyl or ether. In some aspects, silyl is

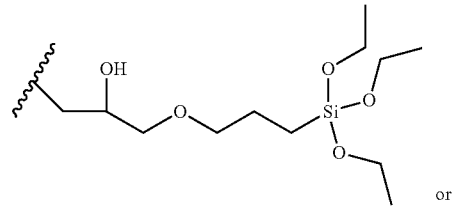

or

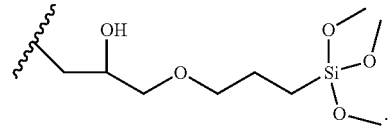

In some aspects, a Schiff base oligomer is represented by Formula (II):

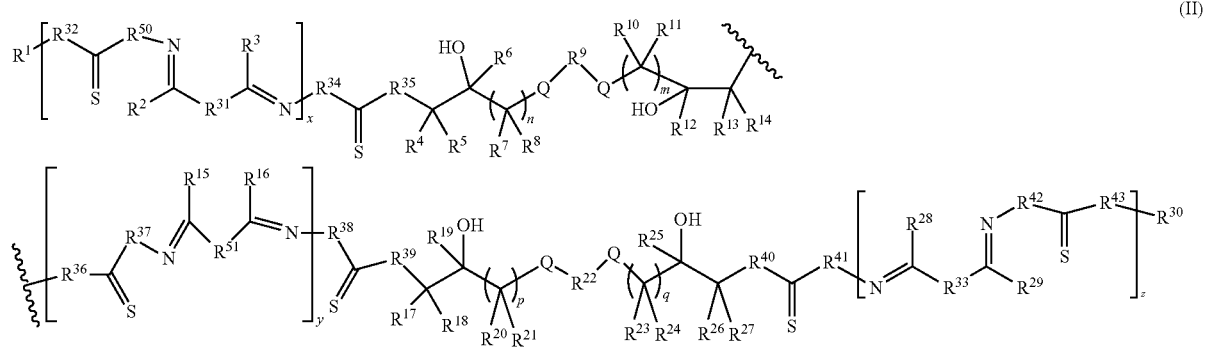

(II)

where:
a wavy line is a line splitting a single bond and indicates a connection point at a second wavy line of the oligomer represented by Formula (II) (In other words, $R^{36}$ is bonded to the carbon located alpha to $R^{14}$).
each of $R^4$, $R^5$, $R^6$, $R^7$, $R^8$, $R^{10}$, $R^{11}$, $R^{12}$, $R^{13}$, $R^{14}$, $R^{17}$, $R^{18}$, $R^{19}$, $R^{20}$, $R^{21}$, $R^{23}$, $R^{24}$, $R^{25}$, $R^{26}$, and $R^{27}$ is independently selected from the group consisting of alkyl, cycloalkyl, alkoxyl, aryloxyl, heterocyclyl, and ether;
each of $R^9$ and $R^{22}$ is independently selected from the group consisting of alkyl, cycloalkyl, aryl, heteroaryl, and ether;
each instance of $R^2$, $R^3$, $R^{15}$, $R^{16}$, $R^{28}$ and $R^{29}$ is independently selected from the group consisting of hydrogen, alkyl, cycloalkyl, and aryl;
each instance of $R^{31}$, $R^{33}$, and $R^{51}$ is independently selected from the group consisting of alkyl, cycloalkyl, aryl, heterocyclyl, and a bond;
each instance of $R^{34}$, $R^{37}$, $R^{38}$, $R^{41}$, $R^{42}$, and $R^{50}$ is independently —NH— or a bond and each instance of $R^{32}$, $R^{35}$, $R^{36}$, $R^{39}$, $R^{40}$, and $R^{43}$ is independently —NH— or —NH—NH—;
each instance of Q is independently —CH$_2$— or oxygen;
each instance of n, m, p, q, x, y, and z is an integer of 1 to 50, such as an integer independently selected from the group consisting of 1, 2, 3, 4, 5, 6, 7, 8, 9, and 10; and each of $R^1$ and $R^{30}$ is independently selected from the group consisting of hydrogen and silyl.

In some aspects, each of x, y, and z of Formula (II) is the integer 1.

In some aspects, each instance of $R^4$, $R^5$, $R^6$, $R^7$, $R^8$, $R^{10}$, $R^{11}$, $R^{12}$, $R^{13}$, $R^{14}$, $R^{17}$, $R^{18}$, $R^{19}$, $R^{20}$, $R^{21}$, $R^{23}$, $R^{24}$, $R^{25}$, $R^{26}$, and $R^{27}$ of Formula (II) is independently selected from the group consisting of hydrogen and $C_1$-$C_5$ alkyl. In some aspects, each instance of $R^4$, $R^5$, $R^6$, $R^7$, $R^8$, $R^{10}$, $R^{11}$, $R^{12}$, $R^{13}$, $R^{14}$, $R^{17}$, $R^{18}$, $R^{19}$, $R^{20}$, $R^{21}$, $R^{23}$, $R^{24}$, $R^{25}$, $R^{26}$, and $R^{27}$ is hydrogen. In some aspects, each instance of $R^2$, $R^3$, $R^{15}$, $R^{16}$, $R^{28}$ and $R^{29}$ is independently selected from the group consisting of hydrogen and $C_1$-$C_5$ alkyl. In some aspects, each instance of $R^2$, $R^3$, $R^{15}$, $R^{16}$, $R^{28}$ and $R^{29}$ is hydrogen. In some aspects, each instance of Q is oxygen.

In some aspects, if $R^{34}$, $R^{37}$, $R^{38}$, $R^{41}$, $R^{42}$, and $R^{50}$ of Formula (II) are —NH—, then, respectively, $R^{32}$, $R^{35}$, $R^{36}$, $R^{39}$, $R^{40}$, and $R^{43}$ are —NH—. In some aspects, if $R^{34}$, $R^{37}$, $R^{38}$, $R^{41}$, $R^{42}$, and $R^{50}$ are a bond, then, respectively, $R^{32}$, $R^{35}$, $R^{36}$, $R^{39}$, $R^{40}$, and $R^{43}$ are —NH—NH—.

In some aspects, each instance of $R^9$ and $R^{22}$ of Formula (II) is independently $C_1$-$C_{10}$ alkyl or a polyether. For example, $R^9$ or $R_{22}$ may be a polyether selected from polyethylene glycol and polypropylene glycol. The polyethylene glycol or polypropylene glycol can have a molecular weight of about 100 g/mol to about 1,000 g/mol, such as about 400 g/mol to about 700 g/mol.

In some aspects, each instance of $R^{31}$, $R^{33}$, and $R^{51}$ of Formula (II) is a bond. In some aspects, each instance of $R^{31}$, $R^{33}$, and $R^{51}$ is independently selected from $C_1$-$C_{10}$ alkyl. In some aspects, each instance of each instance of $R^{31}$, $R^{33}$, and $R^{51}$ is independently selected from a phenyl. For example, a phenyl may be represented by the formula:

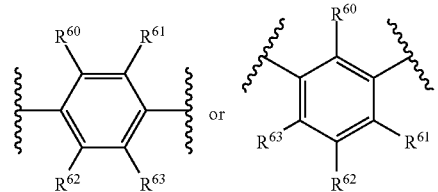

where $R^{60}$, $R^{61}$, $R^{62}$, and $R^{63}$ are independently selected from the group consisting of hydrogen and $C_1$-$C_{10}$ alkyl. In some examples, each of $R^{60}$, $R^{61}$, $R^{62}$, and $R^{63}$ is hydrogen.

In some aspects, $R^1$ and $R^{30}$ of Formula (II) are hydrogen. In some aspects, one or both of $R^1$ and $R^{30}$ are silyl. For example, a silyl may be a glycidyl ether silyl. In some aspects, a silyl is represented by the formula:

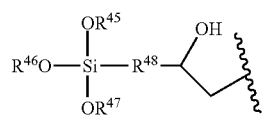

where $R^{45}$, $R^{46}$, and $R^{47}$ are independently selected from the group consisting of hydrogen and $C_1$-$C_{20}$ alkyl, such as $C_1$-$C_5$ alkyl; and $R^{48}$ is selected from the group consisting of (divalent) alkyl, cycloalkyl, ether, and aryl. In some aspects, $R^{48}$ is alkyl or ether. In some aspects, silyl is

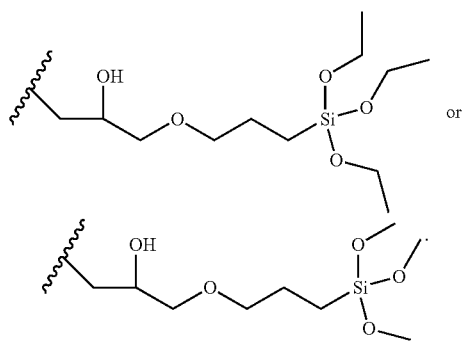

In some aspects, a Schiff base oligomer is represented by Formula (III).

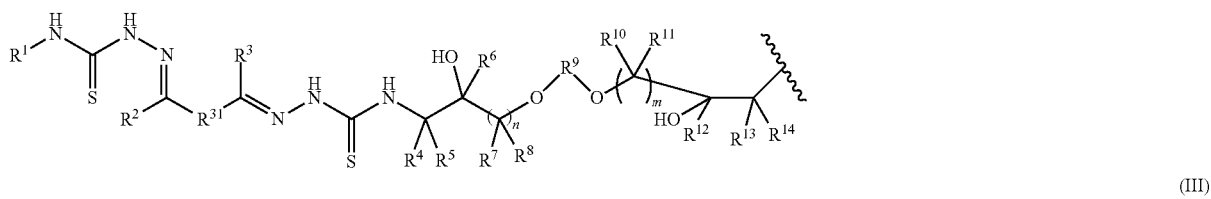

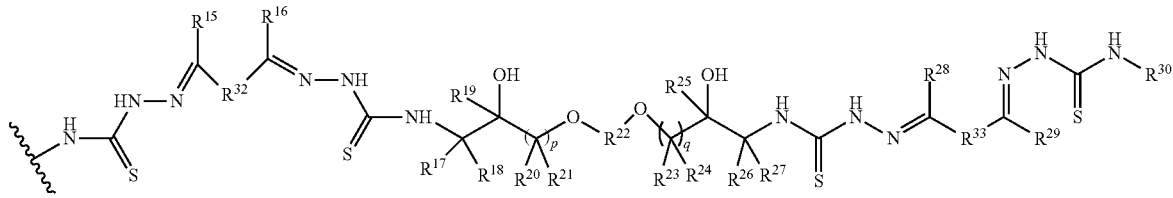

(III)

where:
a wavy line is a line splitting a single bond shown to indicate a connection point at a second wavy line of the oligomer represented by Formula (III) (In other words, the NH group next to the wavy line is bonded to the carbon located alpha to $R^{14}$).
each of $R^4$, $R^5$, $R^6$, $R^7$, $R^8$, $R^{10}$, $R^{11}$, $R^{12}$, $R^{13}$, $R^{14}$, $R^{17}$, $R^{18}$, $R^{19}$, $R^{20}$, $R^{21}$, $R^{23}$, $R^{24}$, $R^{25}$, $R^{26}$, and $R^{27}$ is independently selected from the group consisting of hydrogen, alkyl, cycloalkyl, alkoxyl, aryloxyl, heterocyclyl, and ether;
each of $R^9$ and $R^{22}$ is independently selected from the group consisting of alkyl, cycloalkyl, aryl, heteroaryl, and ether;
each instance of $R^2$, $R^3$, $R^{15}$, $R^{16}$, $R^{28}$ and $R^{29}$ is independently selected from the group consisting of hydrogen, alkyl, cycloalkyl, and aryl;
each instance of $R^{31}$, $R^{32}$, and $R^{33}$ is independently selected from the group consisting of alkyl, cycloalkyl, aryl, heterocyclyl, and a bond;
each instance of n, m, p, and q is an integer of 1 to 50, such as an integer independently selected from the group consisting of 1, 2, 3, 4, 5, 6, 7, 8, 9, and 10; and each of $R^1$ and $R^{30}$ is independently selected from the group consisting of hydrogen and silyl.

In some aspects, each instance of $R^4$, $R^5$, $R^6$, $R^7$, $R^8$, $R^{10}$, $R^{11}$, $R^{12}$, $R^{13}$, $R^{14}$, $R^{17}$, $R^{18}$, $R^{19}$, $R^{20}$, $R^{21}$, $R^{23}$, $R^{24}$, $R^{25}$, $R^{26}$, and $R^{27}$ of Formula (III) is independently selected from the group consisting of hydrogen and $C_1$-$C_5$ alkyl. In some aspects, each instance of $R^4$, $R^5$, $R^6$, $R^7$, $R^8$, $R^{10}$, $R^{11}$, $R^{12}$, $R^{13}$, $R^{14}$, $R^{17}$, $R^{18}$, $R^{19}$, $R^{20}$, $R^{21}$, $R^{23}$, $R^{24}$, $R^{25}$, $R^{26}$, and $R^{27}$ is hydrogen. In some aspects, each instance of $R^2$, $R^3$, $R^{15}$, $R^{16}$, $R^{28}$ and $R^{29}$ is independently selected from the group consisting of hydrogen and $C_1$-$C_5$ alkyl. In some aspects, each instance of $R^2$, $R^3$, $R^{15}$, $R^{16}$, $R^{28}$ and $R^{29}$ is hydrogen.

In some aspects, each instance of $R^9$ and $R^{22}$ of Formula (III) is independently $C_1$-$C_{10}$ alkyl or a polyether. For example, $R^9$ or $R^{22}$ may be a polyether selected from polyethylene glycol and polypropylene glycol. The polyethylene glycol or polypropylene glycol can have a molecular weight of about 100 g/mol to about 1,000 g/mol, such as about 400 g/mol to about 700 g/mol.

In some aspects, each instance of $R^{31}$, $R^{32}$, and $R^{33}$ of Formula (III) is a bond. In some aspects, each instance of $R^{31}$, $R^{32}$, and $R^{33}$ is independently selected from $C_1$-$C_{10}$ alkyl. In some aspects, each instance of each instance of $R^{31}$, $R^{32}$, and $R^{33}$ is independently selected from a phenyl. For example, a phenyl may be represented by the formula:

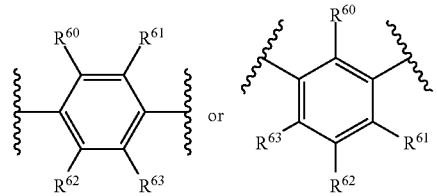

where $R^{60}$, $R^{61}$, $R^{62}$, and $R^{63}$ are independently selected from the group consisting of hydrogen and $C_1$-$C_{10}$ alkyl. In some examples, each of $R^{60}$, $R^{61}$, $R^{62}$, and $R^{63}$ is hydrogen.

In some aspects, $R^1$ and $R^{30}$ of Formula (III) are hydrogen. In some aspects, one or both of $R^1$ and $R^{30}$ are silyl. For example, a silyl may be a glycidyl ether silyl. In some aspects, a silyl is represented by the formula:

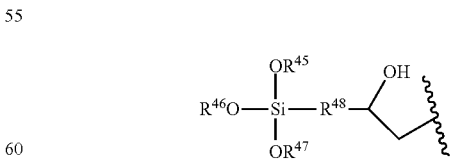

where $R^{41}$, $R^{46}$, and $R^{47}$ are independently selected from the group consisting of hydrogen and $C_1$-$C_{20}$ alkyl, such as $C_1$-$C_5$ alkyl; and $R^{48}$ is selected from the group consisting of (divalent) alkyl, cycloalkyl, ether, and aryl. In some aspects, $R^{48}$ is alkyl or ether. In some aspects, silyl is

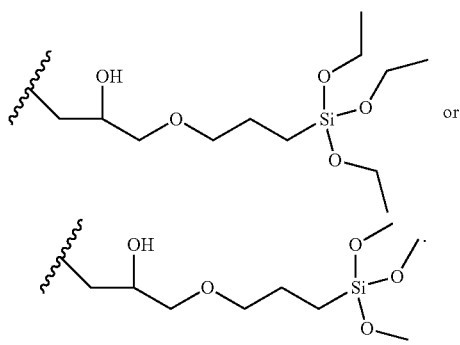

In some aspects, a Schiff base oligomer is represented by Formula (IV):

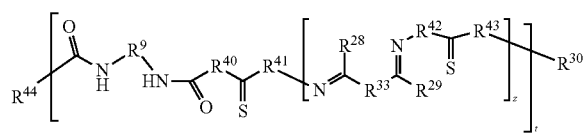

where:
each instance of $R^9$ is independently selected from the group consisting of alkyl, cycloalkyl, aryl, heteroaryl, and ether;
each instance of $R^{28}$ and $R^{29}$ is independently selected from the group consisting of hydrogen, alkyl, cycloalkyl, and aryl;
each instance of $R^{33}$ is independently selected from the group consisting of alkyl, cycloalkyl, aryl, heterocyclyl, and a bond;
each instance of $R^{41}$ is independently —NH— or a bond and each instance of $R^{40}$ is independently —NH— or —NH—NH—;
each instance of $R^{42}$ is independently —NH— or a bond and each instance of $R^{43}$ is independently —NH— or —NH—NH—;
each instance of z and t is an integer of 1 to 50, such as an integer independently selected from the group consisting of 1, 2, 3, 4, 5, 6, 7, 8, 9, and 10;
$R^{44}$ is hydroxyl or decarboxylated derivative thereof, or is represented by the structure:

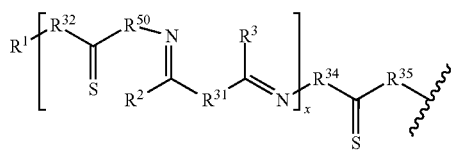

where:
$R^1$ is hydrogen or silyl;
$R^2$ and $R^3$ are independently selected from the group consisting of hydrogen, alkyl, cycloalkyl, and aryl;
$R^{31}$ is selected from the group consisting of alkyl, cycloalkyl, aryl, heterocyclyl, and a bond;
$R^{50}$ is —NH— or a bond and $R^{32}$ is —NH— or —NH—NH—;
$R^{34}$ is —NH— or a bond and $R^{35}$ is —NH— or —NH—NH—; and x is an integer of 1 to 50, such as an integer selected from the group consisting of 1, 2, 3, 4, 5, 6, 7, 8, 9, and 10; and $R^{30}$ is hydrogen, silyl, or is represented by the structure:

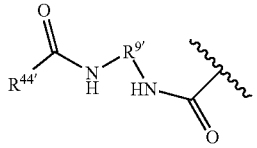

where:
$R^{9'}$ selected from the group consisting of alkyl, cycloalkyl, aryl, heteroaryl, and ether; and
$R^{44'}$ is hydroxyl or decarboxylated derivative thereof.

In some aspects of Formula (IV), each instance of $R^{28}$ or $R^{29}$ (or $R^2$ and $R^3$) is independently selected from the group consisting of hydrogen and $C_1$-$C_5$ alkyl. In some aspects, each instance of $R^{28}$ or $R^{29}$ (or $R^2$ and $R^3$) is hydrogen.

In some aspects of Formula (IV), if $R^{41}$ is —NH—, then $R^{40}$ is —NH—, and/or if $R^{41}$ is a bond, then $R^{40}$ is —NH—NH—. In some aspects, if $R^{42}$ is —NH—, then $R^{43}$ is —NH—, and/or if $R^{42}$ is a bond, then $R^{43}$ is —NH—NH—.

In some aspects of Formula (IV), if $R^{50}$ is —NH—, then $R^{32}$ is —NH—, wherein if $R^{50}$ is a bond, then $R^{32}$ is —NH—NH—. In some aspects, if $R^{34}$ is —NH—, then $R^{35}$ is —NH—, wherein if $R^{34}$ is a bond, then $R^{35}$ is —NH—NH—.

In some aspects of Formula (IV), each instance of $R^9$ (or $R^{9'}$) is independently $C_1$-$C_{10}$ alkyl or an aryl. $R^9$ (or $R^{9'}$) may be a $C_1$-$C_{10}$ cycloalkyl that is cyclohexyl. $R^9$ (or $R^{9'}$) may be an aryl that is phenyl. For example, a phenyl may be represented by the formula:

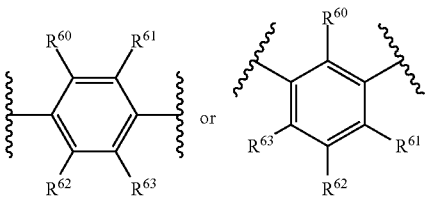

where $R^{60}$, $R^{61}$, $R^{62}$, and $R^{63}$ are independently selected from hydrogen and $C_1$-$C_{10}$ alkyl. In some examples, each of $R^{60}$, $R^{61}$, $R^{62}$, and $R^{63}$ is hydrogen.

In some aspects of Formula (IV), each instance of $R^{33}$ (or $R^{31}$) is a bond. In some aspects, each instance of $R^{33}$ (or $R^{31}$) is independently selected from $C_1$-$C_{10}$ alkyl. In some aspects, each instance of $R^{33}$ (or $R^{31}$) is independently selected from a phenyl. For example, a phenyl may be represented by the formula:

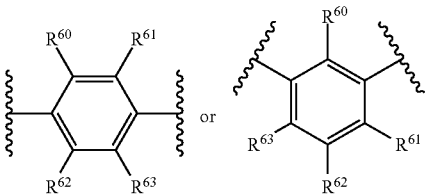

where $R^{60}$, $R^{61}$, $R^{62}$, and $R^{63}$ are independently selected from hydrogen and $C_1$-$C_{10}$ alkyl. In some examples, each of $R^{60}$, $R^{61}$, $R^{62}$, and $R^{63}$ is hydrogen.

In some aspects of Formula (IV), $R^{30}$ and $R^1$ are hydrogen. In some aspects, one or both of $R^{30}$ and $R^1$ are silyl. For example, a silyl may be a glycidyl ether silyl. In some aspects, a silyl is represented by the formula:

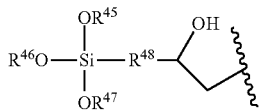

where $R^{45}$, $R^{46}$, and $R^{47}$ are independently selected from the group consisting of hydrogen and $C_1$-$C_{20}$ alkyl, such as $C_1$-$C_5$ alkyl; and $R^{48}$ is selected from the group consisting of (divalent) alkyl, cycloalkyl, ether, and aryl. In some aspects, $R^{48}$ is alkyl or ether. In some aspects, silyl is

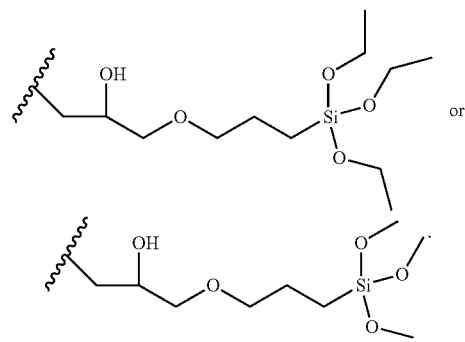

In some aspects, a Schiff base oligomer is represented by Formula (V):

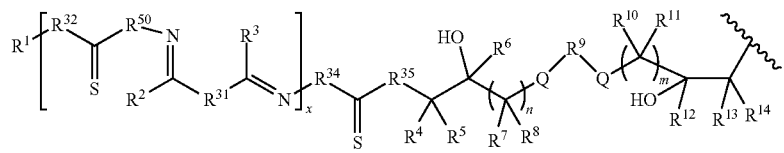

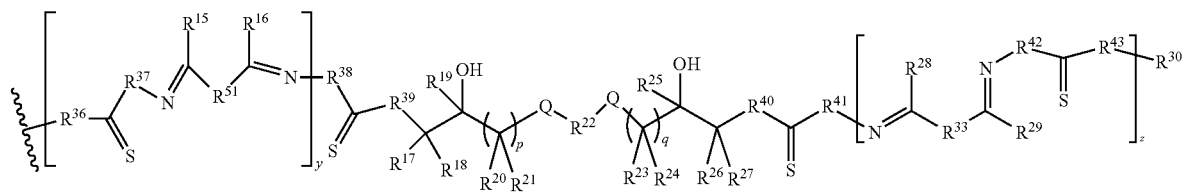

where:
a wavy line is a line splitting a single bond shown to indicate a connection point at a second wavy line of the oligomer represented by Formula (V) (In other words, $R^{36}$ is bonded to the carbon located alpha to $R^{14}$).
each instance of $R^2$, $R^3$, $R^{15}$, $R^{16}$, $R^{28}$ and $R^{29}$ is independently selected from the group consisting of hydrogen, alkyl, cycloalkyl, and aryl;
each of $R^9$ and $R^{22}$ is independently selected from the group consisting of alkyl, cycloalkyl, aryl, heteroaryl, and ether;
each instance of $R^{31}$, $R^{33}$, and $R^{51}$ is independently selected from the group consisting of alkyl, cycloalkyl, aryl, heterocyclyl, and a bond;

each instance of $R^{34}$, $R^{37}$, $R^{38}$, $R^{41}$, $R^{42}$, and $R^{50}$ is independently —NH— or a bond and each instance of $R^{32}$, $R^{35}$, $R^{36}$, $R^{39}$, $R^{40}$, and $R^{43}$ is independently —NH— or —NH—NH—; each instance of x, y, and z is an integer of 1 to 50, such as an integer independently selected from the group consisting of 1, 2, 3, 4, 5, 6, 7, 8, 9, and 10; and each of $R^1$ and $R^{30}$ is independently selected from the group consisting of hydrogen and silyl.

In some aspects, each of x, y, and z of Formula (V) is the integer 1.

In some aspects of Formula (V), each instance of $R^2$, $R^3$, $R^{15}$, $R^{16}$, $R^{28}$ and $R^{29}$ is independently selected from the group consisting of hydrogen and $C_1$-$C_5$ alkyl. In some aspects, each instance of $R^2$, $R^3$, $R^{15}$, $R^{16}$, $R^{28}$ and $R^{29}$ is hydrogen.

In some aspects, if $R^{34}$, $R^{37}$, $R^{38}$, $R^{41}$, $R^{42}$, and $R^{50}$ of Formula (V) are —NH—, then, respectively, $R^{32}$, $R^{35}$, $R^{36}$, $R^{39}$, $R^{40}$, and $R^{43}$ are —NH—. In some aspects, if $R^{34}$, $R^{37}$, $R^{38}$, $R^{41}$, $R^{42}$, and $R^{50}$ are a bond, then, respectively, $R^{32}$, $R^{35}$, $R^{36}$, $R^{39}$, $R^{40}$, and $R^{43}$ are —NH—NH—.

In some aspects, each instance of $R^9$ and $R^{22}$ of Formula (V) is independently $C_1$-$C_{10}$ alkyl or an aryl. $R^9$ and $R^{22}$ may be a $C_1$-$C_{10}$ cycloalkyl that is cyclohexyl. $R^9$ and $R^{22}$ may be an aryl that is phenyl. For example, a phenyl may be represented by the formula:

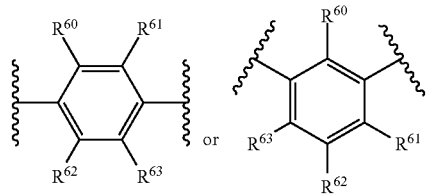

where $R^{60}$, $R^{61}$, $R^{62}$, and $R^{63}$ are independently selected from hydrogen and $C_1$-$C_{10}$ alkyl. In some examples, each of $R^{60}$, $R^{61}$, $R^{62}$, and $R^{63}$ is hydrogen.

In some aspects, each instance of $R^{31}$, $R^{33}$, and $R^{51}$ of Formula (II) is a bond. In some aspects, each instance of $R^{31}$, $R^{33}$, and $R^{51}$ is independently selected from $C_1$-$C_{10}$ alkyl. In some aspects, each instance of each instance of $R^{31}$, $R^{33}$, and $R^{51}$ is independently selected from a phenyl. For example, a phenyl may be represented by the formula:

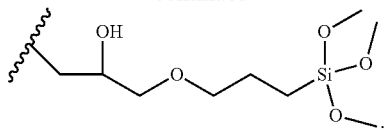

In some aspects, a Schiff base oligomer is represented by Formula (VI):

(VI)

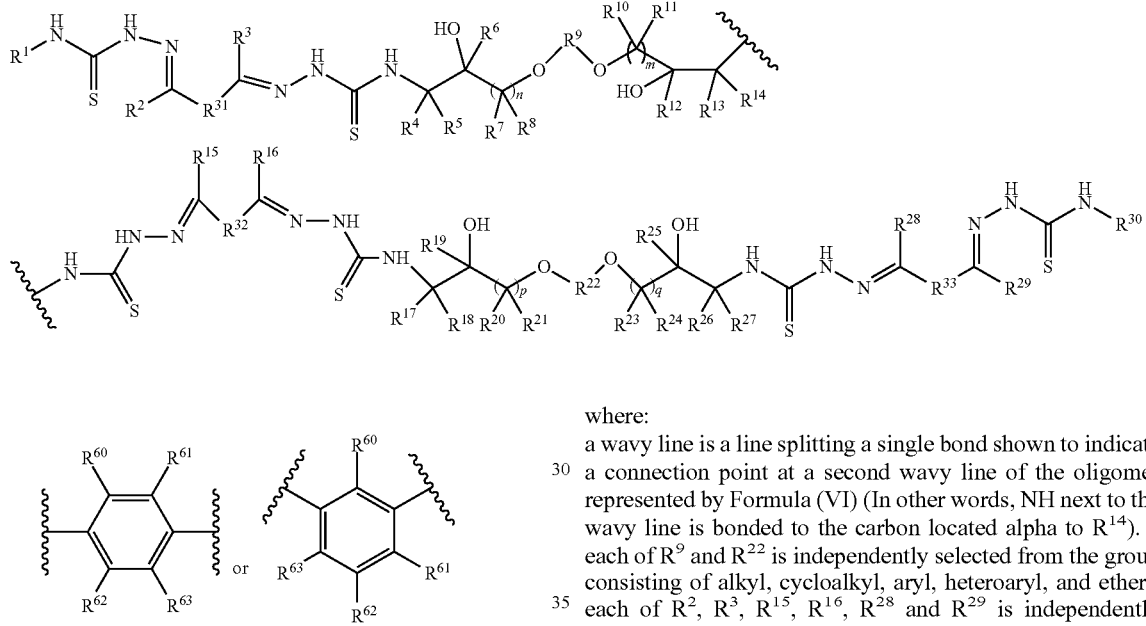

where:
a wavy line is a line splitting a single bond shown to indicate a connection point at a second wavy line of the oligomer represented by Formula (VI) (In other words, NH next to the wavy line is bonded to the carbon located alpha to $R^{14}$).

each of $R^9$ and $R^{22}$ is independently selected from the group consisting of alkyl, cycloalkyl, aryl, heteroaryl, and ether;

each of $R^2$, $R^3$, $R^{15}$, $R^{16}$, $R^{28}$ and $R^{29}$ is independently selected from the group consisting of hydrogen, alkyl, cycloalkyl, and aryl;

each of $R^{31}$, $R^{32}$, and $R^{33}$ is independently selected from the group consisting of alkyl, cycloalkyl, aryl, heterocyclyl, and a bond; and each of $R^1$ and $R^{30}$ is independently selected from the group consisting of hydrogen and silyl.

In some aspects of Formula (VI), each of $R^2$, $R^3$, $R^{15}$, $R^{16}$, $R^{28}$ and $R^{29}$ is independently selected from the group consisting of hydrogen and $C_1$-$C_5$ alkyl. In some aspects, each of $R^2$, $R^3$, $R^{15}$, $R^{16}$, $R^{28}$ and $R^{29}$ is hydrogen.

In some aspects, each instance of $R^9$ and $R^{22}$ of Formula (VI) is independently $C_1$-$C_{10}$ alkyl or an aryl. $R^9$ and $R^{22}$ may be a $C_1$-$C_{10}$ cycloalkyl that is cyclohexyl. $R^9$ and $R^{22}$ may be an aryl that is phenyl. For example, a phenyl may be represented by the formula:

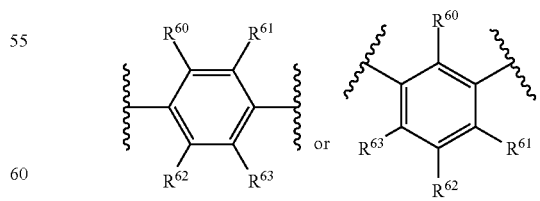

where $R^{60}$, $R^{61}$, $R^{62}$, and $R^{63}$ are independently selected from hydrogen and $C_1$-$C_{10}$ alkyl. In some examples, each of $R^{60}$, $R^{61}$, $R^{62}$, and $R^{63}$ is hydrogen.

In some aspects, $R^1$ and $R^{30}$ of Formula (V) are hydrogen. In some aspects, one or both of $R^1$ and $R^{30}$ are silyl. For example, a silyl may be a glycidyl ether silyl. In some aspects, a silyl is represented by the formula:

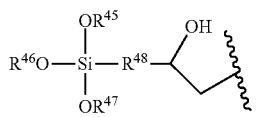

where $R^{45}$, $R^{46}$, and $R^{47}$ are independently selected from the group consisting of hydrogen and $C_1$-$C_{20}$ alkyl, such as $C_1$-$C_5$ alkyl; and $R^{48}$ is selected from the group consisting of (divalent) alkyl, cycloalkyl, ether, and aryl. In some aspects, $R^{48}$ is alkyl or ether. In some aspects, silyl is

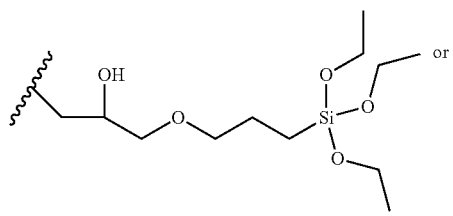

In some aspects, each instance of $R^{31}$, $R^{32}$, and $R^{33}$ of Formula (VI) is a bond. In some aspects, each instance of $R^{31}$, $R^{32}$, and $R^{33}$ is independently selected from $C_1$-$C_{10}$ alkyl. In some aspects, each instance of each instance of $R^{31}$, $R^{32}$, and $R^{33}$ is independently selected from a phenyl. For example, a phenyl may be represented by the formula:

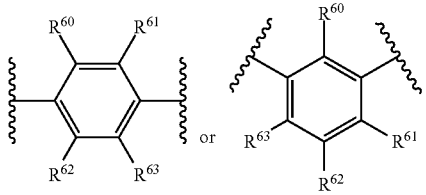

where $R^{60}$, $R^{61}$, $R^{62}$, and $R^{63}$ are independently selected from the group consisting of hydrogen and $C_1$-$C_{10}$ alkyl. In some examples, each of $R^{60}$, $R^{61}$, $R^{62}$, and $R^{63}$ is hydrogen.

In some aspects, $R^1$ and $R^{30}$ of Formula (VI) are hydrogen. In some aspects, one or both of $R^1$ and $R^{30}$ are silyl. For example, a silyl may be a glycidyl ether silyl. In some aspects, a silyl is represented by the formula:

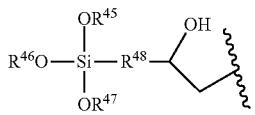

where $R^{45}$, $R^{46}$, and $R^{47}$ are independently selected from the group consisting of hydrogen and $C_1$-$C_{20}$ alkyl, such as $C_1$-$C_5$ alkyl; and $R^{48}$ is selected from the group consisting of (divalent) alkyl, cycloalkyl, ether, and aryl. In some aspects, $R^{48}$ is alkyl or ether. In some aspects, silyl is

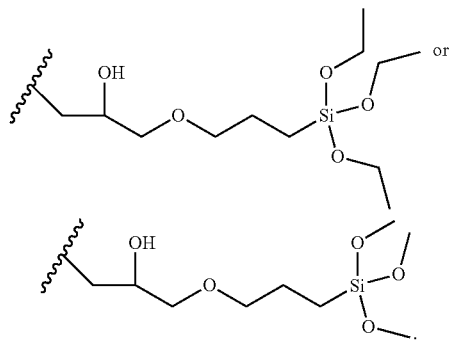

Metals

A Schiff base oligomer may be dispersible in a solvent. A Schiff base oligomer may be in a composition with (e.g., dispersed with or ionically bonded to) one or more metals. For example, a metal can be a cationic species of a transition metal.

Metals can be in the form of a cation or a metal salt. For example, a metal may be selected from alkali earth metals, transition metals and rare earth metal salts, for example a group consisting of Zn, La, Pr, Nd, Sm, Eu, Gd, Tb, Dy, Ho, Er, Tm, Yb, Lu, Ce, Co, Y, Bi, Cd, Pb, Ag, Sb, Sn, Cu, Fe, Ni, Li, Ca, Sr, Mg, Zr, Nd, Ba, Sc, and any combinations thereof. For example, a metal may be selected from a group consisting of Zn, La, Pr, Ce, Co, Y, Ca, Sr, Ba, Sc, and Zr. The metals may be selected from at least one of Zn, Pr and Ce. The metal may be Zn. The metal may be Ce. The metal may be Pr. Some examples of salts that may be used are nitrate salts, chloride salts, acetate salts, or any combinations thereof.

It will be appreciated that the metals may have any suitable oxidation state. For example, the typical oxidation state for Zn is +2. The typical oxidation states for Pr are +2, +3 and/or +4. The typical oxidation states for Ce are +2, +3 and +4. It will be appreciated that various combinations and groups of the above mentioned metal salts, may be used in the compositions of the present disclosure.

Substrates for Corrosion Protection

Substrates that may be protected from corrosion by a Schiff base oligomer or composition thereof may be any suitable substrate, such as a metal substrate or plastic substrate. The metal substrate can include any substrate material having at least a portion of its surface being metallic, for example a portion of its external surface being metallic. The metal substrate may comprise any metal requiring protection from corrosion. The metal substrate may include a metal or alloy selected from aluminum, for example aluminum alloys. The metal substrate may be an aluminum alloy, for example alloys of aluminum with one or more metals selected from the group consisting of copper, magnesium, manganese, silicon, tin, zinc, and combinations thereof. An aluminum alloy may be an alloy comprising copper. The metal substrate may be a copper-containing alloy, such as copper-containing aluminum alloy. The amount of copper in the alloy may be about 1 wt % to about 20 wt %, about 1 wt % to about 18 wt %, about 1 wt % to about 10 wt %, or about 1 wt % to about 6 wt %. The aluminum alloy may be an aerospace alloy, for example AA2XXX and AA7XXX type. For example the aluminum alloy may be AA2024 and AA7075 type. The aluminum alloy may be an automotive alloy, for example AA6XXX type. The aluminum alloy may be a marine alloy, for example AA5XXX type.

Compositions

The present disclosure also relates to compositions (e.g., for inhibiting corrosion) including (a) a Schiff base oligomer and (b) a metal (e.g., metal salt) selected from a rare earth metal, an alkali earth metal, a transition metal, or combinations thereof. The Schiff base oligomer may interact with (e.g., chelate) to the metal. If a solvent (such as water) is included in a composition of the present disclosure, the Schiff base oligomer can be dissociated from (e.g., reversibly coordinated to and from) the metal. In aspects where a composition is substantially free of a solvent, the Schiff base oligomer and the metal (e.g., metal salt) can be in the form of a coordination oligomer (e.g., a compound having ionic bonds between the Schiff base oligomer and the metal), but such coordination oligomers are still considered a composition for purposes of the present disclosure.

For example, a composition may include (a) at least one a Schiff base oligomer and (b) at least one metal (e.g., metal salt), wherein the metal is selected from the group consisting of Zn, La, Pr, Ce, Nd, Sm, Eu, Gd, Tb, Dy, Ho, Er, Tm, Yb, Lu, Co, Y, Ca, Sr, Ba, Sc, and Zr. For example, the at least one metal may be any one of Zn, Ce, Pr, or combinations thereof.

The composition may comprise (a) at least one a Schiff base oligomer and (b) at least one metal (e.g., metal salt), wherein the metal is selected from the group consisting of Zn, Pr, Ce, and combinations thereof.

Compositions of the present disclosure may further include a solvent to provide solubility/dispersibility of the Schiff base oligomer. Solvents may be water, a glycol, or a ketone. Glycols can include glycol acetates, such as glycol ether acetates. Ketones can include acetone or pentanones. In some aspects, a solvent is 1-methoxy-2-propanol acetate, 4-methyl-2-pentanone, or combinations thereof.

The concentration of the Schiff base oligomer may be about 0.001 wt % to about 20 wt %, such as about 0.1 wt % to about 10 wt %, such as about 1 wt % to about 5 wt %, alternatively about 5 wt % to about 10 wt %, which can provide solubility/dispersibility of the Schiff base oligomer.

In some aspects, the molar ratio of metal(s) (e.g., metal salt(s):Schiff base oligomer(s) in a composition is provided with an excess of the metal (e.g., metal salt) in comparison to the Schiff base oligomer, due to the presence of multiple moieties of the Schiff base oligomer that are capable of interacting with a metal. For example, the molar ratio of metal salt:Schiff base oligomer in the composition may be greater than about 1:1, greater than about 1.1:1, greater than about 1.2:1, greater than about 1.3:1, greater than about 1.4:1, greater than about 1.5:1, greater than about 1.6:1, greater than about 1.7:1, greater than about 1.8:1, greater than about 1.9:1, greater than about 2:1, greater than about 3:1, greater than about 4:1, greater than about 5:1, greater than about 6:1, greater than about 7:1, greater than about 8:1, greater than about 9:1, or greater than about 10:1. The ratio of metal salt:Schiff base oligomer in the composition may be less than about 45:1, less than about 40:1, less than about 35:1, less than about 30:1, less than about 25:1, less than about 20:1, less than about 15:1, or less than about 10:1. The ratio of metal:corrosion inhibiting agent in the composition may be greater than about 1:1 to about 45:1, about 1.5:1 to about 40:1, about 2:1 to about 35:1, about 2.5:1 to about 30:1, about 3:1 to about 25:1, about 3.5:1 to about 20:1, about 4:1 to about 15:1, or about 5:1 to about 10:1. For example, the ratio of metal:corrosion inhibiting agent in the composition may be about 1.1:1 to about 45:1, about 1.2:1 to about 40:1, about 1.3:1 to about 35:1, about 1.4:1 to about 30:1, about 1.5:1 to about 25:1, about 1.6:1 to about 20:1, about 1.7:1 to about 15:1, about 1.8:1 to about 10:1, about 1.9:1 to about 9:1, or about 2:1 to about 8:1.

The corrosion inhibitor compositions are suitable for use and application to various substrates, such as metal substrates, and for example can be provided as coating compositions. The compositions may include one or more other additives or corrosion inhibiting agents suitable for use with a substrate of interest.

After depositing a composition onto a substrate, the solvent (if used) can be partially, substantially, or completely removed by any suitable curing process. For example, a coating composition can be applied to a substrate, in either a wet or "not fully cured" condition that dries or cures over time, that is, solvent evaporates. The coatings can dry or cure either at ambient temperature or by accelerated means, for example an ultraviolet light cured system to form a film or "cured" paint. The coatings can also be applied in a semi or fully cured state, such as an adhesive.

The composition can be a coating composition comprising a film-forming organic polymer. The coating composition may be a paint composition. The coating composition may comprise one or more resins, for example epoxy based resins. The coating composition may be a paint composition, for example an epoxy resin based paint composition.

The coating composition may be a powder coating composition, for example a powder coating composition suitable for use in powder coating of various metal substrates including aluminum alloys as described herein or steels.

Compositions of the present disclosure can include one or more additives, such as pigments, fillers and extenders. Examples of suitable additives with which the corrosion inhibitors described herein can be combined include, for example, binders, solvents, pigments (including soluble or non-soluble extenders, fillers, corrosion-inhibiting pigments, and the like), additives (e.g., curing agents, surfactants, dyes, amino acids and the like), and so forth. Note that some additives can also properly be considered a pigment and vice versa (e.g., matting agents). More specifically, these "additives" include, but are not limited to, glycine, arginine, methionine, and derivatives of amino acids, such as methionine sulfoxide, methyl sulfoxide, and iodides/iodates, gelatin and gelatin derivatives, such as animal and fish gelatins, linear and cyclic dextrins, including alpha and beta cyclodextrin, triflic acid, triflates, acetates, talc, kaolin, organic-based ionic exchange resins, such as organic-based cationic and anionic exchange resins, organic-based ionic exchange resins that have been pre-exchanged or reacted with salts, oxides, and/or mixed oxides of rare earth material, and/or metal sulfates, such as sulfates of rare earth materials, magnesium sulfate, calcium sulfate (anhydrous and hydrated forms), strontium sulfate, barium sulfate, and the like, and combinations thereof.

Compositions may also include other additives such as rheology modifiers, fillers, tougheners, thermal or UV stabilizers, fire retardants, lubricants, surface active agents. The additive(s) are usually present in an amount of less than about 10% based on the total weight of the composition after curing. Examples include:

(a) rheology modifiers such as hydroxypropyl methyl cellulose (e.g. Methocell 311, Dow), modified urea (e.g. Byk 411, 410) and polyhydroxycarboxylic acid amides (e.g. Byk 405);

(b) film formers such as esters of dicarboxylic acid (e.g. Lusolvan FBH, BASF) and glycol ethers (e.g. Dowanol, Dow);

(c) wetting agents such as fluorochemical surfactants (e.g. 3M Fluorad) and polyether modified poly-dimethyl-siloxane (e.g. Byk 307, 333);

(d) surfactants such as fatty acid derivatives (e.g. Bermadol SPS 2543, Akzo) and quaternary ammonium salts;

(e) dispersants such as non-ionic surfactants based on primary alcohols (e.g. Merpol 4481, Dupont) and alkylphenol-formaldehyde-bisulfide condensates (e.g. Clariants 1494);

(f) anti foaming agents;

(g) anti corrosion reagents such as phosphate esters (e.g. ADD APT, Anticor C6), alkylammonium salt of (2-benzothiazolythio) succinic acid (e.g. Irgacor 153 CIBA) and triazine dithiols;

(h) stabilizers such as benzimidazole derivatives (e.g. Bayer, Preventol BCM, biocidal film protection);

(i) leveling agents such as fluorocarbon-modified polymers (e.g. EFKA 3777);

(j) pigments or dyes such as fluorescents (Royale Pigment and chemicals);

(k) organic and inorganic dyes such as fluoroscein; and (l) Lewis acids such as lithium chloride, zinc chloride, strontium chloride, calcium chloride and aluminum chloride.

(m) Suitable flame retardants which retard flame propagation, heat release and/or smoke generation which may optionally include any of the following (or combinations thereof):

Phosphorus derivatives such as molecules containing phosphate, polyphosphate, phosphites, phosphazine and phosphine functional groups, for example, melamine phosphate, dimelamine phosphate, melamine polyphosphate, ammonia phosphate, ammonia polyphosphate, pentaerythritol phosphate, melamine phosphite and triphenyl phosphine.

Nitrogen containing derivatives such as melamine, melamine cyanurate, melamine phthalate, melamine phthalimide, melam cyanurate, melem cyanurate, melon cyanurate, hexamethylene tetraamine, imidazole, adenine, guanine, cytosine and thymine.

Molecules containing borate functional groups such as ammonia borate and zinc borate.

Molecules containing two or more alcohol groups such as pentaerythritol, polyethylene alcohol, polyglycols and carbohydrates, for example, glucose, sucrose and starch.

Molecules which endothermically release non-combustible decomposition gases, such as, metal hydroxides, for example, magnesium hydroxide and aluminum hydroxide.

Expandable graphite.

Aspects

The present disclosure provides, among others, the following aspects, each of which may be considered as optionally including any alternate aspects.

Clause 1. An oligomer represented by Formula (I):

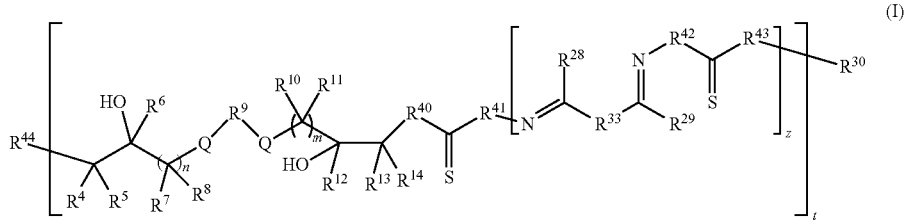

(I)

wherein:

each instance of $R^4$, $R^5$, $R^6$, $R^7$, $R^8$, $R^{10}$, $R^{11}$, $R^{12}$, $R^{13}$, and $R^{14}$ is independently selected from the group consisting of hydrogen, alkyl, cycloalkyl, alkoxyl, aryloxyl, ether, and heterocyclyl; each instance of $R^9$ is independently selected from the group consisting of alkyl, cycloalkyl, aryl, heterocyclyl, and ether;

each instance of $R^{28}$ and $R^{29}$ is independently selected from the group consisting of hydrogen, alkyl, and aryl;

each instance of $R^{33}$ is independently selected from the group consisting of alkyl, cycloalkyl, aryl, heterocyclyl, and a bond;

each instance of $R^{41}$ is independently —NH— or a bond and each instance of $R^{40}$ is independently —NH— or —NH—NH—;

each instance of $R^{42}$ is independently —NH— or a bond and each instance of $R^{43}$ is independently —NH— or —NH—NH—;

each instance of Q is independently —CH$_2$— or oxygen;

each instance of n, m, z and t is an integer of 1 to 50, such as an integer independently selected from the group consisting of 1, 2, 3, 4, 5, 6, 7, 8, 9, and 10;

$R^{44}$ is hydroxyl, hydroxy-substituted alkyl, or is represented by the structure:

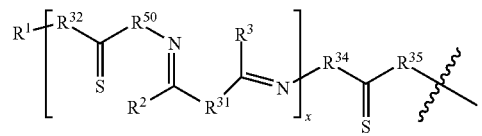

where:

$R^1$ is hydrogen or silyl;

$R^2$ and $R^3$ are independently selected from the group consisting of hydrogen, alkyl, and aryl;

$R^{31}$ is selected from the group consisting of alkyl, cycloalkyl, aryl, heterocyclyl, and a bond;

$R^{50}$ is —NH— or a bond and $R^{32}$ is —NH— or —NH—NH—;

$R^{34}$ is —NH— or a bond and $R^{35}$ is —NH— or —NH—NH—; and x is an integer of 1 to 50, such as an integer selected from the group consisting of 1, 2, 3, 4, 5, 6, 7, 8, 9, and 10; and $R^{30}$ is hydrogen, silyl, or is represented by the structure:

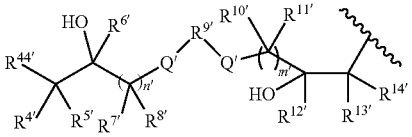

where:

each of $R^{4'}$, $R^{5'}$, $R^{6'}$, $R^{7'}$, $R^{8'}$, $R^{10'}$, $R^{11'}$, $R^{12'}$, $R^{13'}$, and $R^{14'}$ is independently selected from the group consisting of hydrogen, alkyl, cycloalkyl, alkoxyl, aryloxyl, ether, and heterocyclyl;

$R^{9'}$ selected from the group consisting of alkyl, cycloalkyl, heterocyclyl, and ether;

$R^{44'}$ is hydroxyl or hydroxy-substituted alkyl;

each instance of Q' is independently —CH$_2$— or oxygen; and each of n' and m' is an integer of 1 to 50, such as an integer independently selected from the group consisting of 1, 2, 3, 4, 5, 6, 7, 8, 9, and 10.

Clause 2. The oligomer of Clause 1, wherein each instance of $R^4$, $R^5$, $R^6$, $R^7$, $R^8$, $R^{10}$, $R^{11}$, $R^{12}$, $R^{13}$, and $R^{14}$ is independently selected from the group consisting of hydrogen and C$_1$-C$_5$ alkyl.

Clause 3. The oligomer of Clauses 1 or 2, wherein each instance of $R^4$, $R^5$, $R^6$, $R^7$, $R^8$, $R^{10}$, $R^{11}$, $R^{12}$, $R^{13}$, and $R^{14}$ is hydrogen.

Clause 4. The oligomer of any of Clauses 1 to 3, wherein each instance of $R^{28}$ and $R^{29}$ is independently selected from the group consisting of hydrogen and $C_1$-$C_5$ alkyl.

Clause 5. The oligomer of any of Clauses 1 to 4, wherein each instance of $R^{28}$ and $R^{29}$ is hydrogen.

Clause 6. The oligomer of any of Clauses 1 to 5, wherein each instance of Q is oxygen.

Clause 7. The oligomer of any of Clauses 1 to 6, wherein:
if $R^{41}$ is —NH—, then $R^{40}$ is —NH—, and if $R^{41}$ is a bond, then $R^{40}$ is —NH—NH—; and
if $R^{42}$ is —NH—, then $R^{43}$ is —NH—, and if $R^{42}$ is a bond, then $R^{43}$ is —NH—NH—.

Clause 8. The oligomer of any of Clauses 1 to 7, wherein each instance of $R^9$ is independently $C_1$-$C_{10}$ alkyl or a polyether.

Clause 9. The oligomer of any of Clauses 1 to 8, wherein each instance of $R^9$ is a polyether.

Clause 10. The oligomer of any of Clauses 1 to 9, wherein the polyether has a molecular weight of about 400 g/mol to about 700 g/mol.

Clause 11. The oligomer of any of Clauses 1 to 10, wherein each instance of $R^{33}$ is a bond.

Clause 12. The oligomer of any of Clauses 1 to 11, wherein each instance of $R^{33}$ is independently selected from $C_1$-$C_{10}$ alkyl.

Clause 13. The oligomer of any of Clauses 1 to 12, wherein each instance of $R^{33}$ is independently selected from a phenyl represented by the formula:

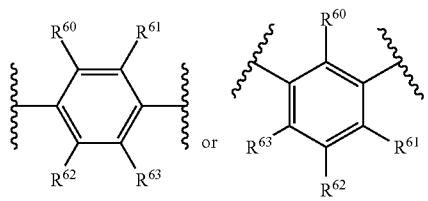

wherein $R^{60}$, $R^{61}$, $R^{62}$, and $R^{63}$ are independently selected from hydrogen and $C_1$-$C_{10}$ alkyl. In some examples, each of $R^{60}$, $R^{61}$, $R^{62}$, and $R^{63}$ is hydrogen.

Clause 14. The oligomer of any of Clauses 1 to 13, wherein each of $R^{30}$ and $R^1$ are hydrogen.

Clause 15. The oligomer of any of Clauses 1 to 14, wherein $R^{30}$ is silyl.

Clause 16. The oligomer of any of Clauses 1 to 16, wherein the silyl is a glycidyl ether silyl.

Clause 17. The oligomer of any of Clauses 1 to 16, wherein the silyl is represented by the formula:

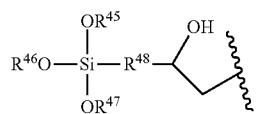

wherein each of $R^{45}$, $R^{46}$, and $R^{47}$ are independently selected from the group consisting of hydrogen and $C_1$-$C_{20}$ alkyl; and $R^{48}$ is selected from the group consisting of alkyl, cycloalkyl, ether, and aryl.

Clause 18. The oligomer of any of Clauses 1 to 17, wherein each of $R^{45}$, $R^{46}$, and $R^{47}$ is hydrogen.

Clause 19. The oligomer of any of Clauses 1 to 18, wherein each of $R^{45}$, $R^{46}$, and $R^{47}$ is $C_1$-$C_5$ alkyl.

Clause 20. The oligomer of any of Clauses 1 to 19, wherein the silyl is selected from the group consisting of:

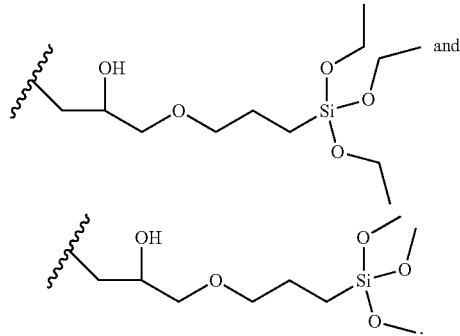

EXAMPLES

Example 1

Synthesis of bis-thiosemicarbazones the di-carbonyl compounds was performed, followed by formation of oligomers with polyethylene glycol diglycidyl ether or similar diglycidyl ethers. Water-soluble diglycidyl ethers of polyethylene glycol are commercially available in 20 kg quantities from Nagase America LLC (Nagase, 2020a, 2020b) with 4, 9, 13 or 22 EO (ethylene oxide) repeat units on average which equates to molecular weights of about 300, 480, 640, and 1000, respectively.

Example 2

Simple dialdehydes such as methyl glyoxal or isophthalaldehyde react with two molecules of thiosemicarbazide to give the bis-thiosemicarbazone by refluxing in ethanol. This has the ability to both bond to metal surfaces through the thiocarbonyls and tertiary nitrogen atoms of the Schiff base, and form a polymer through the thiocarbamide groups by reacting with another carbonyl group or a reactive chain extending species such as diglycidyl ether. The use of low-cost diketones was also performed in which 2,4-pentanedione (acetylacetone) or 2,5-hexanedione (acetonylacetone) could react in the same manner to give a bis-thiosemicarbazone with a larger distance between the bonding sites.

Synthesis of Monomeric Schiff Base

Thiosemicarbazide (0.01 mol, 0.91 g) was dissolved in ethanol (50 cm³) in 250 cm³ three necked round bottom flask and was attached to ice cooled reflux condenser fitted over the magnetic stirrer. To this solution, salicylaldehyde (0.02 mol, 2.44 cm³) in ethanol (20 cm³) was added drop wise. The reaction mixture was acidified with concentrated HCl, and refluxed with constant stirring at room temperature for 2 hrs. The reaction mixture was allowed to stand for 40 min. Light yellow precipitate was obtained, which was filtered and purified by washing repeatedly with distilled water and diethyl ether. It was dried at 40° C. for 8 h to give monomeric Schiff base, N,N'-bis (Salicylidene) thiosemicarbazide Schiff base, yield 72%.

Synthesis of Schiff Base Oligomer (STFB)

Schiff base oligomer was synthesized by adding formaldehyde (0.02 mol, 1.5 cm³) into monomeric Schiff base (0.01 mol, 2.99 gm) in molar ratio of (2:1) in 250 cm³ three necked round bottom flask equipped with thermometer, condenser and magnetic stirrer in 50 cm³ DMF. 0.5 cm³ of 40% aq. NaOH was added in this reaction mixture. The temperature was maintained up to 70±5° C. for 1 hr with continuous stirring. The progress of reaction was monitored by TLC (thin layer chromatography). To this mixture, barbituric acid (0.01 mol, 1.28 gm) in 20 cm³ DMF was added and stirred again for about 2 & ½ h up to 100° C. until it gave reddish-yellow sticky compound. It was then precipitated in distilled water and washed several times with acetone and diethyl ether. After drying it in oven for 5-7 hrs at 40° C., Schiff base oligomer STFB was obtained 70% yield.

Synthesis of Coordination Oligomers

Coordination oligomers of [Mn(II), Co(II), Ni(II), Cu(II) and Zn(II)] were prepared by using equimolar ratio (1:1) of Schiff base ligand and metal(II) acetates. The typical procedure for the preparation of metal polychelate of manganese(II) was as follows: The Schiff base oligomer (0.01 mol) was dissolved in (20 cm³) DMF and heated at 60° C. in a three-necked round bottom flask fitted to an ice-cooled condenser. Solution of manganese (II) acetate tetrahydrate Mn(CH₃COO)₂·4H₂O (0.01 mol, 2.45 gm) was added in 15 cm³ DMF with constant stirring to the hot and clear solution of Schiff base and refluxed for 7 hrs. Stirring was continued until complete dissolution and distinct color change was achieved. Finally, a brown colored viscous solution was obtained. It was then precipitated, filtered and washed several times with distilled water and diethyl ether, which gave a brown precipitate. It was then oven dried at 45° C. for 5-6 hrs to obtain the polychelate of manganese [STFB-Mn (II)], 81% yield.

Reaction 1—Schiff Base Reaction Proof of Concept

Using ethanol as the solvent and concentrated HCl as the reaction catalyst, both ends of thiosemicarbazide will react with an aldehyde, such as salicylaldehyde as shown below, in 72% isolated yield.

Scheme 1

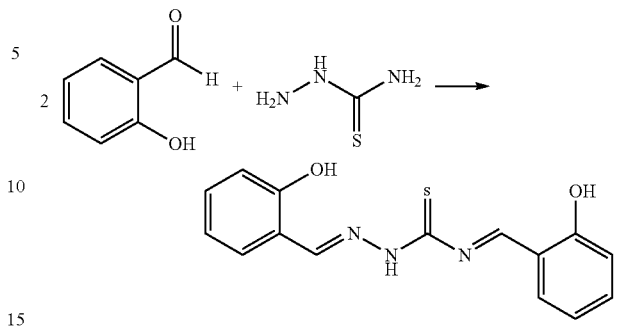

Reaction 2

Making an oligomeric species using about 1.8 equivalents of dialdehyde (or other dicarbonyl such as a keto-aldehyde or diketone) and 1 equivalent of thiosemicarbazide as shown below.

Scheme 2

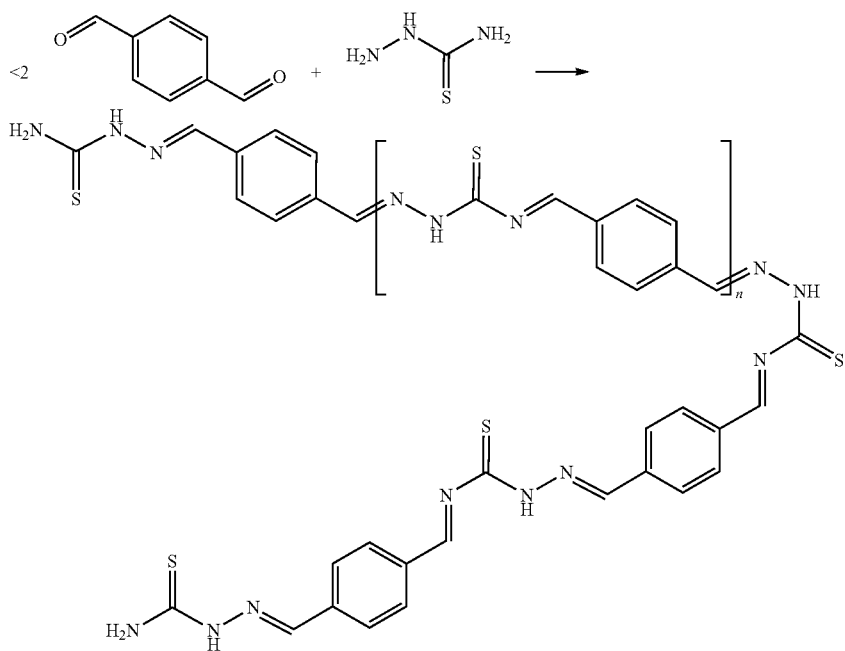

Reaction 3

Scheme 3

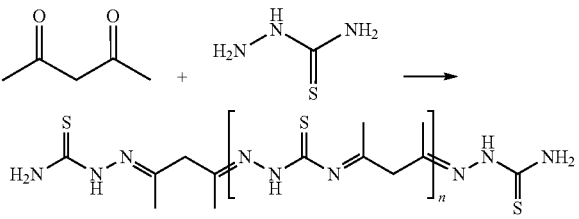

Reaction 4

Scheme 4

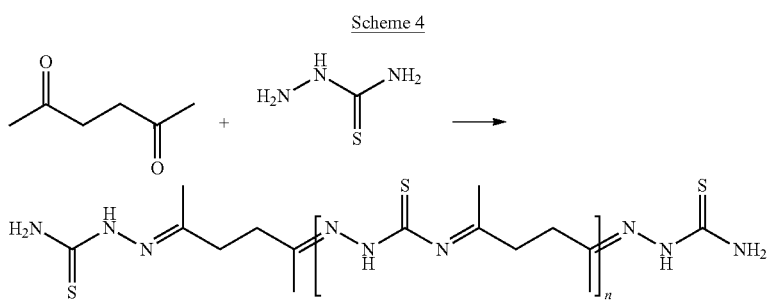

Formation of Bis-Thiosemicarbazone of Terephthalaldehyde (1)

A 250 mL three-necked round-bottom flask was charged with a solution of thiosemicarbazide (9.11 g, 0.100 mole) dissolved in 100 mL of ethanol. A PTFE stirring bar was added, and the flask is placed in soft heating mantle on a magnetic stir plate. The center neck was fitted with a reflux condenser. One side-neck was fitted with an addition funnel charged with a solution of terephthalaldehyde (6.57 g, 0.049 mol) in 50 mL of ethanol. The other side neck was fitted with a second addition funnel charged with a solution of 1 mL of 12 N HCl (concentrated HCl) in 20 mL of ethanol.

Scheme 5

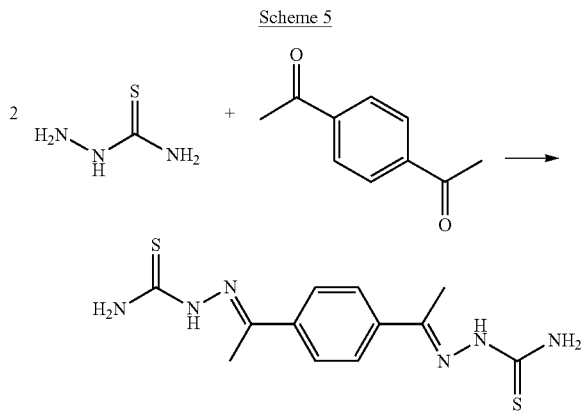

The solution of terephthalaldehyde was slowly added to the flask with stirring at room temperature over a period of 30 minutes followed by the solution of HCl. After the acid was added, the heating mantle was turned on, and the mixture was refluxed for two to three hours. The heat was turned off, and the mixture was allowed to cool slowly back to room temperature. The product precipitated as a yellow solid and collected by filtration on a Buchner funnel. The product was washed with D.I. water (3×50 mL) and ethyl ether (1×50 mL) and dried in oven at 100 F overnight. $C_{10}H_{12}N_6S_2$: mol. wt. 280.41. Yield=13.74 of product. By-products are 0.18 g of excess thiosemicarbazide and 1.76 g of water.

Reaction of (1) with Diglycidyl Ether or Diisocyanates

A solution of 5 grams of the polymer made in the previous section and 0.05 gram of the appropriate catalyst was dissolved in 25 mL of solvent. This solution was charged to a 100 mL three-necked round bottom flask containing a PTFE stir bar and fitted with a reflux condenser, addition funnel, and thermocouple. The flask was placed in a water bath, and placed on a magnetic heated stirring plate. The addition funnel was charged with a solution of 0.9 equivalents of the desired chain extender (below) dissolved in 25 mL of the same solvent. This was added dropwise to the flask with stirring over a period of 30 minutes, and the temperature was monitored. The temperature should rise as the two components combine. The temperature should be kept below 100° C. by appropriate means such as adding ice to the water bath.

After one hour, all of the reactive chain extender should be consumed. Residual epoxy content can be determined by a titration (ASTM D1652), and residual isocyanate can be determined by titration (Dow, 2000).

TABLE 1

| Material | Mol. Wt. | Eq. Wt. | CASRN |
| --- | --- | --- | --- |
| Reactive chain extenders | | | |
| HDI | 168 | 84 | 822-06-0 |
| Desmodur N (Covestro) | | | |
| H12MDI | 262 | 131 | 5124-30-1 |
| Vestanat (Evonik) | | | |
| Desmodur (Covestro) | | | |
| Polyethylene glycol diglycidyl ether (500) | 500 | 250 | 17557-23-2 |
| Polypropylene glycol diglycidyl ether (600) | 600 | | 26142-30-3 |
| Ethylene glycol diglycidyl ether | 174 | 87 | 224-15-9 |
| Propylene glycol diglycidyl ether | 188 | 94 | 16096-30-3 |
| Catalysts | | | |
| Dibutyltin dilaurate (DBTDL) (if using diisocyanates) | 631.56 | | 77-58-7 |
| 2,4,6-tris (dimethylaminomethyl)-phenol (DMP-30) (if using di-glycidyl ethers) | 265.39 | | 90-72-2 |
| Solvents | | | |
| 1-methoxy-2-acetoxypropane Dowanol ™ PMA Glycol Ether Acetate | 132.2 | n/a | 108-65-6 |
| MIBK (4-methyl-2-pentanone) | 100.2 | n/a | 108-10-1 |

Formation of Bis-Thiosemicarbazone of Pyruvaldehyde (2)

A 250 mL three-necked round-bottom flask was charged with a solution of thiosemicarbazide (10.02 g, 0.110 mole) dissolved in 100 mL of ethanol. A PTFE stirring bar was added, and the flask was placed in soft heating mantle on a magnetic stir plate. The center neck was fitted with a reflux condenser. One side-neck was fitted with an addition funnel charged with a solution of pyruvaldehyde dimethyl acetal (5.78 g, 0.049 mol) in 50 mL of ethanol. This compound was also called methylglyoxal dimethyl acetal. The other side neck was fitted with a second addition funnel charged with a solution of 1 mL of 12 N HCl (concentrated HCl) in 20 mL of ethanol.

Scheme 6

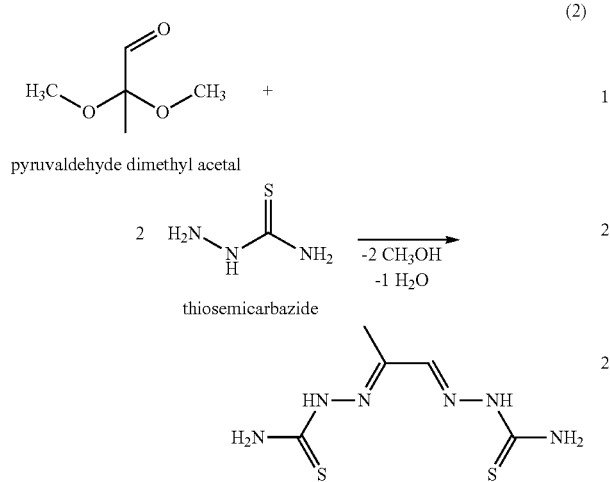

Reaction of (2) with a Generic Di-Glycidyl Ether

Shown below is the reaction of two Schiff bases (SB) and three diglycidyl ethers. The starting SB is a crystalline solid while the product is expected to be a viscous liquid which is more suitable for use in coating metals surfaces either independently or as an ingredient in a coating formulation. Other difunctional chain extenders could be considered.

Scheme 7

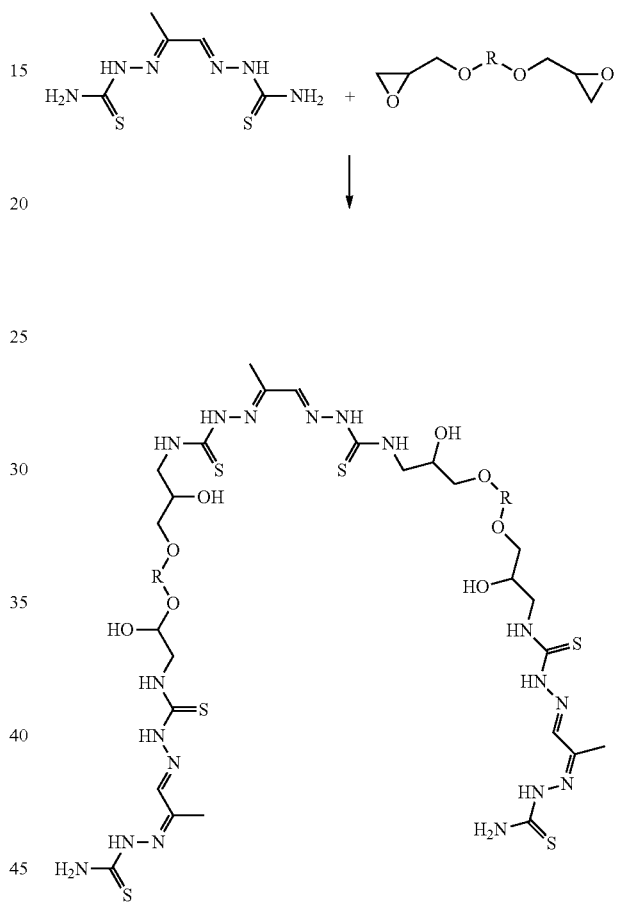

TABLE 2

| Material | Mol. Wt. | Moles | Grams | mL | CASRN |
|---|---|---|---|---|---|
| Pyruvaldehyde dimethyl acetal | 118.13 | 0.049 | 5.78 | 5.9 | 6342-56-9 |
| Thiosemicarbazide | 91.13 | 0.11 | 10.02 | n/a | 79-19-6 |
| Ethanol | | n/a | n/a | 170 | |
| Conc. HCl | 12N | 0.012 | | 1 | |

The solution of thiosemicarbazide was heated to 50-60 C (just below reflux). To this was added the solution of pyruvaldehyde dimethyl acetal with stirring at room temperature over a period of 30-40 minutes followed by the solution of HCl. After the acid was added, the heating mantle and stirrer were turned off, and the mixture was allowed to cool slowly back to room temperature for about two hours. If possible, place the reaction mixture in a refrigerator for two or three days in increase the crude yield. The product should precipitate as a yellow solid. The solid was collected on a Buchner funnel.

The crude product was recrystallized by dissolving it in the minimum amount of refluxing methanol in a beaker on a hot plate in the fume hood. An equal amount of distilled water was added, removed from heat, and then allowed to cool. Product precipitated as white-yellowish needles. Collect by filtration on a Buchner funnel. Dry in oven at 100 F overnight.

$C_5H_{10}N_6S_2$: mol. wt. 218.29 Th. Yield=10.69 of product By-products are 1.09 g of excess thiosemicarbazide, 3.13 g of methanol and 0.88 g of water.
Reference: Petering, 1964.

Schiff Base Oligomer and Epoxy Composition #1

A 500 cc. reaction vessel, fitted with a stirrer and water-cooled condenser, was charged with 179 grams (0.5 mole) of a diglycidyl polyether of polypropylene glycol having an epoxy equivalent weight of 78.5 grams a Schiff base polymer, and 2.6 grams of powdered sodium hydroxide, as a catalyst. During the first hour, cooling was used to moderate the reaction at 100° C. to 120° C. At the end of this hour, less than 1 percent of the diepoxide remained unreacted.

Schiff Base Oligomer and Epoxy Composition #2

2.47 grams of a Schiff base oligomer and epoxy composition or a Schiff base oligomer composition were mixed with 0.87 gram (0.01 equivalent) of toluene diisocyanate (TDI) and 1.5 grams dimethylformamide diluent. These compounds were mixed, adding the TDI last. A film was cast on a bondarized steel panel and baked for minutes at 300° F. to give a thermosetting, clear, orange coating, with a high hardness.

Materials

The table below list materials used as disclosed herein including example difunctional chain extending molecules including diglycidyl ether and diisocyanates.

TABLE 3

| | Formula | CASRN | Supplier | Quantity | Type |
|---|---|---|---|---|---|
| Aldehydes and thiosemi-carbazide | | | | | |
| Methyl-glyoxal 1,1-didimethyl acetal | CH$_3$COCH(OCH$_3$)$_2$ | 6342-56-9 | Sigma Aldrich | 100 mL | Keto-aldehyde |
| Acetyl-acetone (2,4-pentanedione) | C$_5$H$_8$O$_2$ | 123-54-6 | Sigma Aldrich | 1 kg | di-ketone |
| Acetonyl-acetone (2,5-hexanedione) | C$_6$H$_{10}$O$_2$ | 110-13-4 | Sigma Aldrich | 100 mL | di-ketone |
| Isophthal-aldehyde | C$_8$H$_6$O$_2$ | 626-19-7 | Sigma Aldrich | 10 g | di-aldehyde |
| Terephthal-aldehyde | C$_8$H$_6$O$_2$ | 623-27-8 | Sigma Aldrich | 100 g | di-aldehyde |
| 5-(hydroxy-methyl)-furan-2-carbaldehyde | C$_6$H$_6$O$_3$ | 67-47-0 | Fisher Science | | Aldehyde w/OH |
| Thiosemi-carbazide | CH$_5$N$_3$S | 79-19-6 | Fisher Science | | Thiosemi-carbazide |
| Diglycidyl ether | | | | | |
| Polyethylene glycol diglycidyl ether | | 17557-23-2 | Nagase America | 20 kg | Di-epoxy |
| Ethylene glycol diglycidyl ether | C$_8$H$_{14}$O$_4$ | 2224-15-9 | Fisher Science | 25 g | Di-epoxy |

Schiff Base Oligomers having Silyl-End Cap

A solution of 5 grams of the bis-thiosemicarbazone made in the previous section and 0.05 gram of the appropriate catalyst was dissolved in 25 mL of the desired solvent. This solution was charged to a 100 mL three-necked round bottom flask containing a PTFE stir bar and fitted with a reflux condenser, addition funnel, and thermocouple. The flask was placed in a water bath, and placed on a magnetic heated stirring plate. The addition funnel was charged with a solution of 1.2 equivalents of the desired chain extender dissolved in 25 mL of the same solvent. This was added dropwise to the flask with stirring over a period of 30 minutes, and the temperature was monitored. The temperature should rise as the two components combine. The temperature was kept below 100 C by appropriate means such as adding ice to the water bath. After one hour, all of the reactive chain extender should be consumed. Residual epoxy content can be determined by a titration (ASTM D1652), and residual isocyanate can be determined by titration (Dow, 2000).

Use of a small amount of trimethoxysilylpropyl glycidyl ether gave an end-group that could react with metal surfaces through metal-O—Si bond formation.

Scheme 8

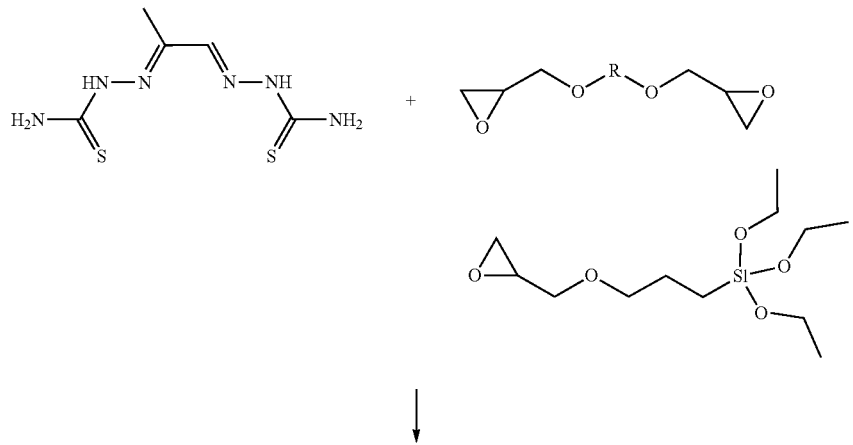

-continued

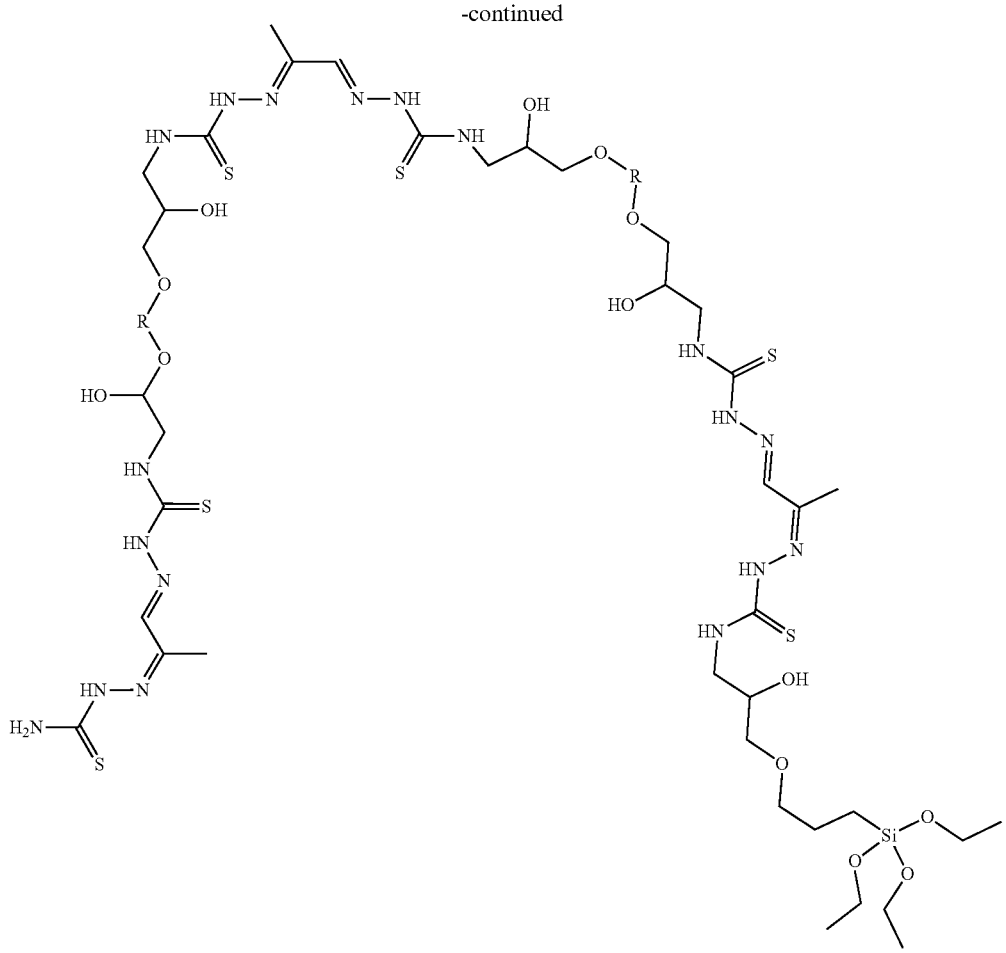

This kind of structure has multiple modes of bonding to a metal surface including three bis-Schiff base groups, secondary hydroxyl groups, and by, for example, cleavage of the three ethoxysilyl groups with OH groups on the metal surface.

This Schiff base oligomer having a silyl-end cap can be dissolved in an appropriate solution at low solids contents to prepare a solution for dip-coating or spray coating a metal part. Drying could be achieved by heating with IR heat sources, hot air sources, or some combination of the two.

Chemical Terms

As used herein, a wavy line of a chemical structure indicates a connection point between the moiety shown to the rest of the molecule.

The term "composition" as used herein can include the components (e.g., an oligomer and metal and/or metal salt) and/or reaction product(s) of two or more components of the composition.

Unless otherwise stated/claimed, groups/moieties of Schiff base oligomers described in the present disclosure are unsubstituted or substituted. The term "substituted" means that a group is substituted at any available position. Substitution can be with one or more groups selected from, e.g., alkyl, alkenyl, alkynyl, cycloalkyl, cycloalkenyl, aryl, heterocyclyl, heteroaryl, formyl, alkanoyl, cycloalkanoyl, aroyl, heteroaroyl, carboxyl, alkoxycarbonyl, cycloalkyloxycarbonyl, aryloxycarbonyl, heterocyclyloxycarbonyl, heteroaryloxycarbonyl, alkylaminocarbonyl, cycloalkylaminocarbonyl, arylaminocarbonyl, heterocyclylaminocarbonyl, heteroarylaminocarbonyl, cyano, alkoxy, cycloalkoxy, aryloxy, heterocyclyloxy, heteroaryloxy, alkanoate, cycloalkanoate, aryloate, heterocyclyloate, heteroaryloate, alkylcarbonylamino, cycloalkylcarbonylamino, arylcarbonylamino, heterocyclylcarbonylamino, heteroarylcarbonylamino, nitro, hydroxyl, halo (—F, —Cl, —Br, —I), haloalkyl, haloaryl, haloheterocyclyl, haloheteroaryl, haloalkoxy, silylalkyl, alkenylsilylalkyl, alkynylsilylalkyl, or amino. In some aspects, a substitution may be halo, alkyl, formyl, or amino. The optional substituents may include salts of the groups, for example carboxylate salts. It will be appreciated that "substituted" may include other groups not specifically described.

"Alkyl" whether used alone, or in compound words such as alkoxy, alkylthio, alkylamino, dialkylamino or haloalkyl, represents straight or branched chain hydrocarbons ranging in size from one to about 10 carbon atoms, or more. Thus alkyl moieties include, unless explicitly limited to smaller groups, moieties ranging in size, for example, from one to about 6 carbon atoms or greater, such as, methyl, ethyl, n-propyl, iso-propyl, butyl, pentyl, hexyl, and higher isomers, including, e.g., those straight or branched chain hydrocarbons ranging in size from about 6 to about 10 carbon atoms, or greater.

"Cycloalkyl" represents a mono- or polycarbocyclic ring system of varying sizes, e.g., from about 3 to about 10 carbon atoms, e.g., cyclopropyl, cyclobutyl, cyclopentyl, cyclohexyl or cycloheptyl. The term cycloalkyloxy represents the same groups linked through an oxygen atom such as cyclopentyloxy and cyclohexyloxy. The term cycloalkylthio represents the same groups linked through a sulfur atom such as cyclopentylthio and cyclohexylthio.

As will be understood, an aromatic group means a cyclic group having 4 m+2 π electrons, where m is an integer equal to or greater than 1. As used herein, "aromatic" is used interchangeably with "aryl" to refer to an aromatic group, regardless of the valency of aromatic group. Thus, aryl refers to monovalent aromatic groups, bivalent aromatic groups and higher multivalency aromatic groups.

"Aryl" whether used alone, or in compound words such as arylalkyl, aryloxy or arylthio, represents: (i) an optionally substituted mono- or polycyclic aromatic carbocyclic moiety, e.g., of about 6 to about 60 carbon atoms, such as phenyl, naphthyl or fluorenyl; or, (ii) an optionally substituted partially saturated polycyclic carbocyclic aromatic ring system in which an aryl and a cycloalkyl or cycloalkenyl group are fused together to form a cyclic structure such as a tetrahydronaphthyl, indenyl, indanyl or fluorene ring.

"Heterocyclyl" or "heterocyclic" whether used alone, or in compound words such as heterocyclyloxy represents: (i) an optionally substituted cycloalkyl or cycloalkenyl group, e.g., of about 3 to about 60 ring members, which may contain one or more heteroatoms such as nitrogen, oxygen, or sulfur (examples include pyrrolidinyl, morpholino, thiomorpholino, or fully or partially hydrogenated thienyl, furyl, pyrrolyl, thiazolyl, oxazolyl, oxazinyl, thiazinyl, pyridyl and azepinyl); (ii) an optionally substituted partially saturated polycyclic ring system in which an aryl (or heteroaryl) ring and a heterocyclic group are fused together to form a cyclic structure (examples include chromanyl, dihydrobenzofuryl and indolinyl); or (iii) an optionally substituted fully or partially saturated polycyclic fused ring system that has one or more bridges (examples include quinuclidinyl and dihydro-1,4-epoxynaphthyl).

A heteroaromatic group is an aromatic group or ring containing one or more heteroatoms, such as N, O, S, Se, Si or P. As used herein, "heteroaromatic" is used interchangeably with "heteroaryl", and a heteroaryl group refers to monovalent aromatic groups, bivalent aromatic groups and higher multivalency aromatic groups containing one or more heteroatoms. "Heteroaryl" is considered one non-limiting type of "heterocyclyl".

"Heteroaryl", whether used alone, or in compound words such as heteroaryloxy represents: (i) an optionally substituted mono- or polycyclic aromatic organic moiety, e.g., of about 1 to about 10 ring members in which one or more of the ring members is/are element(s) other than carbon, for example nitrogen, oxygen, sulfur or silicon; the heteroatom (s) interrupting a carbocyclic ring structure and having a sufficient number of delocalized pi electrons to provide aromatic character, provided that the rings do not contain adjacent oxygen and/or sulfur atoms. Typical 6-membered heteroaryl groups are pyrazinyl, pyridazinyl, pyrazolyl, pyridyl and pyrimidinyl. All regioisomers are contemplated, e.g., 2-pyridyl, 3-pyridyl and 4-pyridyl. Typical 5-membered heteroaryl rings are furyl, imidazolyl, oxazolyl, isoxazolyl, isothiazolyl, oxadiazolyl, pyrrolyl, 1,3,4-thiadiazolyl, thiazolyl, thienyl, triazolyl, and silole. All regioisomers are contemplated, e.g., 2-thienyl and 3-thienyl. Bicyclic groups typically are benzo-fused ring systems derived from the heteroaryl groups named above, e.g., benzofuryl, benzimidazolyl, benzthiazolyl, indolyl, indolizinyl, isoquinolyl, quinazolinyl, quinolyl and benzothienyl; or, (ii) an optionally substituted partially saturated polycyclic heteroaryl ring system in which a heteroaryl and a cycloalkyl or cycloalkenyl group are fused together to form a cyclic structure such as a tetrahydroquinolyl or pyrindinyl ring.

"Hydroxyl" and "hydroxy" can be used interchangeably and represent a —OH moiety.

"Alkoxy" and "alkoxyl" can be used interchangeably and represent an —O-alkyl group in which the alkyl group is as defined supra. Examples include methoxy, ethoxy, n-propoxy, iso-propoxy, and the different butoxy, pentoxy, hexyloxy and higher isomers.

"Aryloxy" and "aryloxyl" can be used interchangeably and represent an —O-aryl group in which the aryl group is as defined supra. Examples include, without limitation, phenoxy and naphthoxy.

The compounds described herein may include salts, solvates, hydrates, isomers, tautomers, racemates, stereoisomers, enantiomers or diastereoisomers of those compounds. For example, salts may include sodium, potassium, calcium, nitrates, phosphates, sulfates, chlorides, or combinations thereof.

While the foregoing is directed to aspects of the present disclosure, other and further aspects of the disclosure may be devised without departing from the basic scope thereof, and the scope thereof is determined by the claims that follow.

What is claimed is:
1. An oligomer represented by Formula (I):

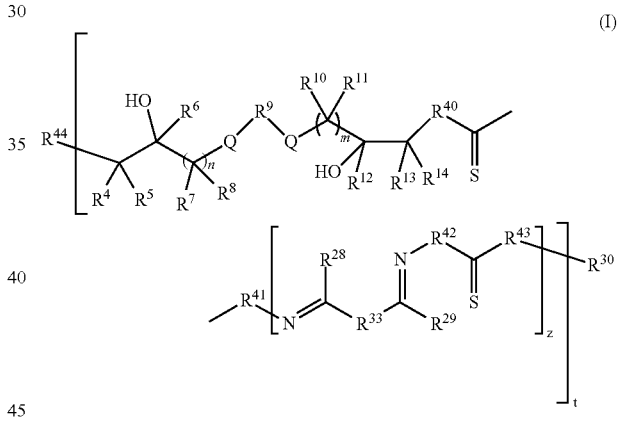

wherein:
each instance of $R^4$, $R^5$, $R^6$, $R^7$, $R^8$, $R^{10}$, $R^{11}$, $R^{12}$, $R^{13}$, and $R^{14}$ is independently selected from the group consisting of hydrogen, alkyl, cycloalkyl, alkoxyl, aryloxyl, ether, and heterocyclyl;
each instance of $R^9$ is independently selected from the group consisting of alkyl, cycloalkyl, aryl, heterocyclyl, and ether;
each instance of $R^{28}$ and $R^{29}$ is independently selected from the group consisting of hydrogen, alkyl, and aryl;
each instance of $R^{33}$ is independently selected from the group consisting of alkyl, cycloalkyl, aryl, heterocyclyl, and a bond;
each instance of $R^{41}$ is independently —NH— or a bond and each instance of $R^{40}$ is independently —NH— or —NH—NH—;
each instance of $R^{42}$ is independently —NH— or a bond and each instance of $R^{43}$ is independently —NH— or —NH—NH—;
each instance of Q is independently —CH$_2$— or oxygen;
each instance of n, m, z and t is an integer of 1 to 50;

$R^{44}$ is hydroxyl, hydroxy-substituted alkyl, or is represented by the structure:

[structure showing chemical formula with R¹, R³², R⁵⁰, R³, R², R³¹, R³⁴, R³⁵, N, S groups and x subscript]

where:
- $R^1$ is hydrogen or silyl;
- $R^2$ and $R^3$ are independently selected from the group consisting of hydrogen, alkyl, and aryl;
- $R^{31}$ is selected from the group consisting of alkyl, cycloalkyl, aryl, heterocyclyl, and a bond;
- $R^{50}$ is —NH— or a bond and $R^{32}$ is —NH— or —NH—NH—;
- $R^{34}$ is —NH— or a bond and $R^{35}$ is —NH— or —NH—NH—; and
- x is an integer of 1 to 50; and $R^{30}$ is hydrogen, silyl, or is represented by the structure:

[structure showing chemical formula with HO, R⁶', R⁹', R¹⁰', R¹¹', R⁴⁴', R⁴', R⁵', R⁷', R⁸', Q', HO, R¹²', R¹³', R¹⁴', n, m groups]

where:
- each of $R^{4'}$, $R^{5'}$, $R^{6'}$, $R^{7'}$, $R^{8'}$, $R^{10'}$, $R^{11'}$, $R^{12'}$, $R^{13'}$, and $R^{14'}$ is independently selected from the group consisting of hydrogen, alkyl, cycloalkyl, alkoxyl, aryloxyl, ether, and heterocyclyl;
- $R^{9'}$ selected from the group consisting of alkyl, cycloalkyl, heterocyclyl, and ether;
- $R^{44'}$ is hydroxyl or hydroxy-substituted alkyl;
- each instance of Q' is independently —CH₂— or oxygen; and
- each of n' and m' is an integer of 1 to 50.

2. The oligomer of claim 1, wherein each instance of $R^4$, $R^5$, $R^6$, $R^7$, $R^8$, $R^{10}$, $R^{11}$, $R^{12}$, $R^{13}$, and $R^{14}$ is independently selected from the group consisting of hydrogen and $C_1$-$C_5$ alkyl.

3. The oligomer of claim 1, wherein each instance of $R^4$, $R^5$, $R^6$, $R^7$, $R^8$, $R^{10}$, $R^{11}$, $R^{12}$, $R^{13}$, and $R^{14}$ is hydrogen.

4. The oligomer of claim 1, wherein each instance of $R^{28}$ and $R^{29}$ is independently selected from the group consisting of hydrogen and $C_1$-$C_5$ alkyl.

5. The oligomer of claim 4, wherein each instance of $R^{28}$ and $R^{29}$ is hydrogen.

6. The oligomer of claim 1, wherein each instance of Q is oxygen.

7. The oligomer of claim 6, wherein:
- if $R^{41}$ is —NH—, then $R^{40}$ is —NH—, and if $R^{41}$ is a bond, then $R^{40}$ is —NH—NH—; and
- if $R^{42}$ is —NH—, then $R^{43}$ is —NH—, and if $R^{42}$ is a bond, then $R^{43}$ is —NH—NH—.

8. The oligomer of claim 6, wherein each instance of $R^9$ is independently $C_1$-$C_{10}$ alkyl or a polyether.

9. The oligomer of claim 8, wherein each instance of $R^9$ is a polyether.

10. The oligomer of claim 8, wherein the polyether has a molecular weight of about 400 g/mol to about 700 g/mol.

11. The oligomer of claim 6, wherein each instance of $R^{33}$ is a bond.

12. The oligomer of claim 6, wherein each instance of $R^{33}$ is independently selected from $C_1$-$C_{10}$ alkyl.

13. The oligomer of claim 6, wherein each instance of $R^{33}$ is independently selected from a phenyl represented by the formula:

[two phenyl ring structures with R⁶⁰, R⁶¹, R⁶², R⁶³ substituents] or [phenyl structure with R⁶⁰, R⁶¹, R⁶², R⁶³ substituents]

wherein $R^{60}$, $R^{61}$, $R^{62}$, and $R^{63}$ are independently selected from hydrogen and $C_1$-$C_{10}$ alkyl.

14. The oligomer of claim 6, wherein each of $R^{30}$ and $R^1$ are hydrogen.

15. The oligomer of claim 6, wherein $R^{30}$ is silyl.

16. The oligomer of claim 15, wherein the silyl is derived from a glycidyl ether silyl.

17. The oligomer of claim 15, wherein the silyl is represented by the formula:

[structure showing R⁴⁶O—Si(OR⁴⁵)(OR⁴⁷)—R⁴⁸ with OH group]

wherein each of $R^{45}$, $R^{46}$, and $R^{47}$ are independently selected from the group consisting of hydrogen and $C_1$-$C_{20}$ alkyl; and $R^{48}$ is selected from the group consisting of alkyl, cycloalkyl, ether, and aryl.

18. The oligomer of claim 17, wherein each of $R^{45}$, $R^{46}$, and $R^{47}$ is hydrogen.

19. The oligomer of claim 17, wherein each of $R^{45}$, $R^{46}$, and $R^{47}$ is $C_1$-$C_5$ alkyl.

20. The oligomer of claim 17, wherein the silyl is selected from the group consisting of:

[two silyl structures with OH, O, Si, ethoxy groups] and

* * * * *

UNITED STATES PATENT AND TRADEMARK OFFICE
CERTIFICATE OF CORRECTION

PATENT NO. : 11,713,374 B2
APPLICATION NO. : 17/191024
DATED : August 1, 2023
INVENTOR(S) : Andrew Michael Zweig et al.

It is certified that error appears in the above-identified patent and that said Letters Patent is hereby corrected as shown below:

On the Title Page

In item (56), in Column 2, under "Other Publications", Line 10, delete "Polychelates,"" and insert -- Polychelates," Received: 6 October 2014 / --.

In item (56), in Column 2, under "Other Publications", Line 13, delete "terepthalaldehyde" and insert -- terephthalaldehyde --.

In item (56), in Column 2, under "Other Publications", Line 14, delete "plymeric" and insert -- polymeric --.

In the Claims

In Column 39, Lines 26-32, in Claim 1, delete " 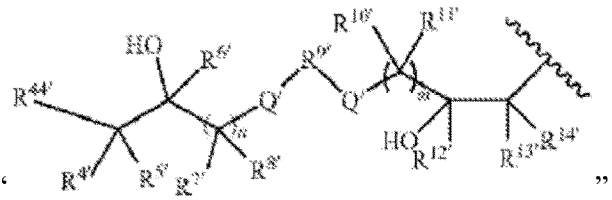 "

and insert -- 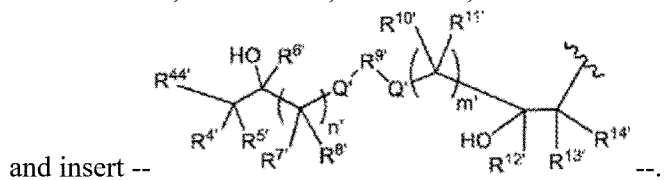 --.

Signed and Sealed this
Tenth Day of December, 2024

Katherine Kelly Vidal
*Director of the United States Patent and Trademark Office*

CERTIFICATE OF CORRECTION (continued)
U.S. Pat. No. 11,713,374 B2

In Column 40, Lines 56-63, in Claim 20, delete " 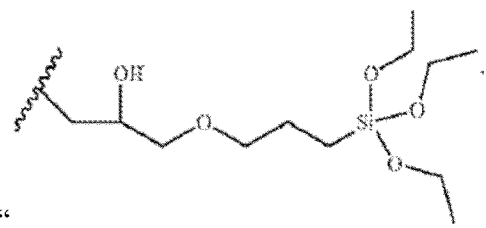 " and insert 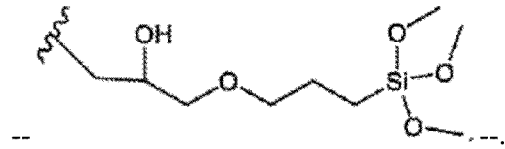 --.